(12) United States Patent
Tsukitani et al.

(10) Patent No.: US 6,466,721 B1
(45) Date of Patent: Oct. 15, 2002

(54) DISPERSION COMPENSATING OPTICAL FIBER AND OPTICAL TRANSMISSION LINE

(75) Inventors: Masao Tsukitani; Eisuke Sasaoka; Eiji Yanada; Yuichi Ohga, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 100 days.

(21) Appl. No.: 09/618,752

(22) Filed: Jul. 18, 2000

(30) Foreign Application Priority Data

Jul. 19, 1999 (JP) .......................... 11-205002
Jul. 19, 1999 (JP) .......................... 11-205010
Jun. 2, 2000 (JP) .......................... 2000-166298

(51) Int. Cl.$^7$ .............................................. G02B 6/22
(52) U.S. Cl. ..................................................... 385/127
(58) Field of Search ................................. 385/123–128

(56) References Cited

U.S. PATENT DOCUMENTS

| | | | | |
|---|---|---|---|---|
| 5,361,319 A | * | 11/1994 | Antos et al. | 385/123 |
| 5,555,340 A | * | 9/1996 | Onishi et al. | 385/127 |
| 5,838,867 A | * | 11/1998 | Onishi et al. | 385/123 |
| 6,301,419 B1 | * | 10/2001 | Tsukitani et al. | 385/123 |

FOREIGN PATENT DOCUMENTS

| | | |
|---|---|---|
| EP | 0554714 B1 | 12/1999 |
| JP | 10-325913 | 12/1998 |

OTHER PUBLICATIONS

G.E. Berkey et al., "Negative Slope Dispersion Compensating Fibers", Science and Technology Division.
Kazunori Mukasa et al., "Novel Network Fiber to Manage Dispersion at 1.55μm with Combination of 1.3μm Zero Dispersion Single Mode Fiber", Conference Publications No. 448, Sep. 22–25, 1997, pp. 127–130.
M. Murakami et al., "Quarter Terabit (25×10Gb/s) Over 9288 km WDM Transmission Experiment using Nonlinear Supported RZ Pulse in Higher Order Fiber Dispersion Managed Line".
A. Boskovic et al., "Measurement of Nonlinear Refractive Index $n_2$ of Dispersion Compensating Fibres", 22nd European Conference on Optical Communication, ECOC '96, pp. 249–252.

* cited by examiner

Primary Examiner—Akm E. Ullah
Assistant Examiner—Jerry T Rahll
(74) Attorney, Agent, or Firm—McDermott, Will & Emery

(57) ABSTRACT

The present invention relates to an optical transmission line suitably used for a large-capacity high-speed WDM optical transmission system, and an optical fiber suitably used for such an optical transmission line. The optical transmission line is formed by connecting a single-mode optical fiber (SMF) and a dispersion compensating optical fiber (DCF). The dispersion compensating optical fiber has a dispersion value $D_{DCF}$ (unit: ps/nm/km) and dispersion slope $S_{DCF}$ (unit: ps/nm$^2$/km) falling within the ranges of $-82 \leq D_{DCF} \leq -29$ and $0.0023 \times D_{DCF} \leq S_{DCF} \leq 0.033 + 0.0015 \times D_{DCF}$ at a wavelength of 1,550 nm, respectively. At the wavelength of 1,550 nm, the transmission loss is 0.5 dB/km or less. Letting $L_{DCF}$ be the length of the dispersion compensating optical fiber, and $L_{SMF}$ be the length of the single-mode optical fiber, the value $L_{DCF}/(L_{DCF}+L_{SMF})$ in the optical transmission line is 0.2 to 0.4. This optical transmission line can suppress the nonlinear optical phenomenon and is suitable to long-distance large-capacity transmission because the optical transmission line has a small transmission loss and low nonlinear index.

15 Claims, 18 Drawing Sheets

DISPERSION COMPENSATING OPTICAL FIBER AND OPTICAL TRANSMISSION LINE

BACKGROUND OF THE INVENTION

1. Field of the Invention

The present invention relates to an optical transmission line suitably used for a large-capacity high-speed WDM optical transmission system, and an optical fiber suitably used for such an optical transmission line.

2. Related Background Art

An optical transmission system employing the WDM (Wavelength Division Multiplexing) scheme transmits a wavelength-multiplexed optical signal in the 1.55-μm wavelength band through an optical fiber transmission network and enables large-capacity high-speed communication. This optical transmission system is constructed by an optical fiber transmission line as an optical signal transmission medium, an optical amplifier for amplifying a wavelength-multiplexed optical signal at once, and the like. Various researches and developments have been made to enable larger-capacity higher-speed WDM communication.

For an optical transmission line, reduction of dispersion and a dispersion slope is an important subject of study. More specifically, when an optical transmission line has dispersion in the wavelength band of an optical signal, the waveform of optical signal sent from the transmitting station deforms through the optical transmission line to cause reception degradation at the receiving station, because the optical signal has a certain bandwidth though the signal is monochromatic. Hence, dispersion in optical transmission line is preferably as small as possible in the signal wavelength band. For large-capacity communication, dispersion in optical transmission line is desirably small in a signal wavelength band as wide as possible. Hence, the dispersion slope in the optical transmission line is also preferably as small as possible.

SUMMARY OF THE INVENTION

Studies have been made to almost nullify both dispersion and a dispersion slope in an optical transmission line in the 1.55-μm wavelength band. More specifically, a single-mode optical fiber having a zero dispersion wavelength in the 1.3-μm wavelength band and positive dispersion and a positive dispersion slope at the wavelength of 1,550 nm and a dispersion compensating optical fiber having negative dispersion and a negative dispersion slope at the wavelength of 1,550 nm are connected and constructed as an optical transmission line, thereby almost nullifying both dispersion and a dispersion slope as a whole in the 1.55-μm wavelength band for the optical transmission line. The present inventor, however, has found that the above-described optical transmission line formed by connecting an existing dispersion compensating optical fiber to a single-mode optical fiber is not always preferable for actual construction from the viewpoint of transmission loss and nonlinear optical phenomenon.

The present invention has been made to solve the above problem, and has as its object to provide a dispersion compensating optical fiber which has a small average transmission loss and can suppress a nonlinear optical phenomenon for an entire optical transmission line when connected to a single-mode optical fiber to form the optical transmission line, and an optical transmission line having such a dispersion compensating optical fiber.

According to the present invention, there is provided a dispersion compensating optical fiber having:

a dispersion value $D_{DCF}$ (unit: ps/nm/km) falling within a range of $-82 \leq D_{DCF} \leq -29$ at a wavelength of 1,550 nm;

a dispersion slope $S_{DCF}$ (unit: ps/nm²/km) falling within a range of $0.0023 \times D_{DCF} \leq S_{DCF} \leq 0.033 + 0.0015 \times D_{DCF}$ at the wavelength of 1,550 nm; and a transmission loss of not more than 0.5 dB/km at the wavelength of 1,550 nm.

When this dispersion compensating optical fiber is connected, at an appropriate length ratio, to a single-mode optical fiber having a zero dispersion wavelength in a 1.3-μm band and positive dispersion at a wavelength of 1,550 nm, an optical transmission line which reduces both the transmission loss and nonlinear index can be formed.

Especially, the dispersion compensating optical fiber preferably has the dispersion value $D_{DCF}$ (unit: ps/nm/km) falling within a range of $-82 \leq D_{DCF} \leq -36$ at the wavelength of 1,550 nm. In this case, the nonlinearity of the dispersion compensating optical fiber is further reduced, and an optical transmission line with a smaller nonlinear index can be formed.

The dispersion compensating optical fiber according to the present invention preferably comprises a core region including an optical axis center and having a first refractive index, a first cladding region surrounding the core region and having a second refractive index lower than the first refractive index, and a second cladding region surrounding the first cladding region and having a third refractive index lower than the first refractive index and higher than the second refractive index. This easily realizes a dispersion compensating optical fiber having the dispersion value $D_{DCF}$ and dispersion slope $S_{DCF}$ which satisfy the above inequalities.

In this dispersion compensating optical fiber, a relative refractive index difference of the core region to the second cladding region preferably falls within the range of 1.3% to 1.7%, and a relative refractive index difference of the first cladding region to the second cladding region preferably falls within the range of −0.5% to −0.2%.

The dispersion compensating optical fiber according to the present invention preferably comprises a core region including an optical axis center and having a first refractive index, a first cladding region surrounding the core region and having a second refractive index lower than the first refractive index, a second cladding region surrounding the first cladding region and having a third refractive index lower than the first refractive index and higher than the second refractive index, and a third cladding region surrounding the second cladding region and having a fourth refractive index lower than the third refractive index and higher than the second refractive index. This easily realizes a dispersion compensating optical fiber having the dispersion value $D_{DCF}$ and dispersion slope $S_{DCF}$ which satisfy the above inequalities.

In this dispersion compensating optical fiber, a relative refractive index difference of the core region to the third cladding region preferably falls within the range of 1.3% to 1.7%, and a relative refractive index difference of the first cladding region to the third cladding region preferably falls within the range of −0.5% to −0.2%.

According to the present invention, there is also provided an optical transmission line formed by connecting:

a single-mode optical fiber having a zero dispersion wavelength in a 1.3-μm wavelength band and a positive dispersion slope $S_{SMF}$ (unit: ps/nm²/km) at a wavelength of 1,550 nm and used for a cable line; and a dispersion compensating optical fiber, when letting R be a DCF ratio representing a ratio of the length of the dispersion compensating optical fiber to the length of the entire cable line, having a dispersion value $D_{DCF}$ (unit: ps/nm/km) falling within a range of $-82 \leq D_{DCF} \leq -29$ at the wavelength of 1,550 nm, a dispersion slope $S_{DCF}$ (unit: ps/nm²/km) falling within a range of $0.0023 \times D_{DCF} \leq S_{DCF} \leq [0.03-(1-R)S_{SMF}]/R$ (unit: ps/nm²/km) at the wavelength of 1,550 nm, and a transmission loss of not more than 0.5 dB/km at the wavelength of 1550 nm.

In this optical transmission line, both the transmission loss and nonlinear index are small. Especially, the DCF ratio R is preferably 0.2 to 0.4.

In the optical transmission line according to the present invention, the dispersion compensating optical fiber preferably has the dispersion value $D_{DCF}$ (unit: ps/nm/km) falling within a range of $-82 \leq D_{DCF} \leq -36$ at the wavelength of 1,550 nm. In this case, the nonlinearity of the dispersion compensating optical fiber is further reduced, and the nonlinear index of the optical transmission line itself becomes smaller.

In the optical transmission line according to the present invention, the single-mode optical fiber preferably has an effective sectional area $A_{eff}$ of not less than 100 μm² at the wavelength of 1,550 nm. This suppresses the power density of propagation light and suppresses degradation in waveform due to the nonlinear effect.

In the optical transmission line according to the present invention, preferably, the single-mode optical fiber has a core region and a cladding region, and the core region is formed from silica which is not intentionally doped with an impurity, and transmission loss at the wavelength of 1,550 nm is not more than 0.18 dB/km. In this case, the loss in the entire optical transmission line can be reduced by making the Rayleigh scattering coefficient small. As a result, the power of incident light can be suppressed, and degradation in waveform due to the nonlinear effect can be suppressed.

In a dispersion compensating optical fiber according to the present invention, a minimum wavelength (to be referred to as a "leading wavelength" hereinafter) at which an increase amount of an actual loss value with respect to a theoretical loss value is not less than 10 mdB/km in a use wavelength band and on a long wavelength side of the use wavelength band preferably falls within the range of 1,565 to 1,700 nm and, more preferably, 1,620 to 1,700 nm.

In this case, when this dispersion compensating optical fiber is connected, at an appropriate length ratio, to a single-mode optical fiber having a zero dispersion wavelength in a 1.3-μm band and positive dispersion at a wavelength of 1,550 nm, an optical transmission line which reduces both the transmission loss and nonlinear index in the use wavelength band can be formed. If the use wavelength band is the C band (1,520 to 1,565 nm), the leading wavelength of the dispersion compensating optical fiber preferably falls within the range of 1,565 to 1,700 nm. If the use wavelength band includes not only the C band but also the L band (1,565 to 1,620 nm), the leading wavelength of the dispersion compensating optical fiber preferably falls within the range of 1,620 to 1,700 nm.

An optical transmission line according to the present invention is preferably formed by connecting a single-mode optical fiber having a zero dispersion wavelength in a 1.3-μm wavelength band and positive dispersion at a wavelength of 1,550 nm to the above-described dispersion compensating optical fiber. In this optical transmission line, both the transmission loss and nonlinear index are sufficiently small.

DETAILED DESCRIPTION OF THE PREFERRED EMBODIMENT

Figure 1:
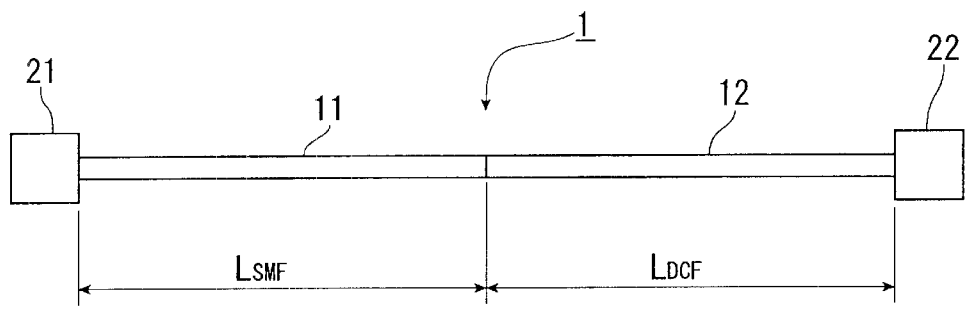
FIG. 1 is a view showing the arrangement of an optical transmission line according to an embodiment.

An embodiment of the present invention will be described below with reference to the accompanying drawings. The same reference numerals denote the same elements throughout the drawings, and a detailed description thereof will be omitted.

FIG. 1 is a view showing the arrangement of an optical transmission line 1 according to this embodiment. The optical transmission line 1 of this embodiment is formed by connecting an upstream single-mode optical fiber (SMF) 11 to a downstream dispersion compensating optical fiber (DCF) 12, and constructed between a relay 21 and a relay 22. At least one of the relays 21 and 22 may be a station. The single-mode optical fiber 11 has a zero dispersion wavelength in the 1.3-$\mu$m wavelength (1250 nm to 1350 nm) band and positive dispersion and a positive dispersion slope at a wavelength of 1,550 nm. The dispersion compensating optical fiber 12 has negative dispersion and a negative dispersion slope at the wavelength of 1,550 nm. A wavelength-multiplexed optical signal in the 1.55-$\mu$m wavelength band, which is output from the relay 21 sequentially propagates through the single-mode optical fiber 11 and dispersion compensating optical fiber 12 and reaches the relay 22.

For the single-mode optical fiber 11, let $L_{SMF}$ be the length, $D_{SMF}$ (unit: ps/nm/km) be the dispersion value at the wavelength of 1,550 nm, and $S_{SMF}$ (unit: ps/nm$^2$/km) be the dispersion slope at the wavelength of 1,550 nm. For the dispersion compensating optical fiber 12, let $L_{DCF}$ be the length, $D_{DCF}$ (unit: ps/nm/km) be the dispersion value at the wavelength of 1,550 nm, and $S_{DCF}$ (unit: ps/nm$^2$/km) be the dispersion slope at the wavelength of 1,550 nm. For the entire optical transmission line 1, let $D_{total}$ (unit: ps/nm/km) be the average dispersion value at the wavelength of 1,550 nm, and $S_{total}$ (unit: ps/nm$^2$/km) be the average dispersion slope at the wavelength of 1,550 nm. A DCF ratio R representing the ratio of the length of dispersion compensating optical fiber 12 to the length of entire optical transmission line 1 is defined by $$R = L_{DCF}/(L_{DCF}+L_{SMF}) \quad (1)$$

At this time, $$D_{total} = R \cdot D_{DCF} + (1-R) \cdot D_{SMF} \quad (2a)$$

$$S_{total} = R \cdot S_{DCF} + (1-R) \cdot S_{SMF} \quad (2b)$$

In the optical transmission line 1 of this embodiment, the value of DCF ratio R ranges from 0.2 to 0.4.

For the single-mode optical fiber 11, the dispersion value $D_{SMF}$ is about 17 to 19 ps/nm/km, and the dispersion slope $S_{SMF}$ is about 0.05 to 0.06 ps/nm$^2$/km. In the single-mode optical fiber 11, the core region may be made of GeO$_2$-doped silica while the cladding region may be made of pure silica, or the core region may be made of pure silica while the cladding region may be formed from F-doped silica. However, the single-mode optical fiber 11 is preferably a pure silica core fiber having a core region formed from pure silica which is not intentionally doped with an impurity such as GeO$_2$. In this case, the loss in the entire optical transmission line 1 can be reduced by decreasing the Rayleigh scattering coefficient. As a result, degradation in waveform due to the nonlinear effect can be suppressed by reducing light incident power.

Figure 2A:
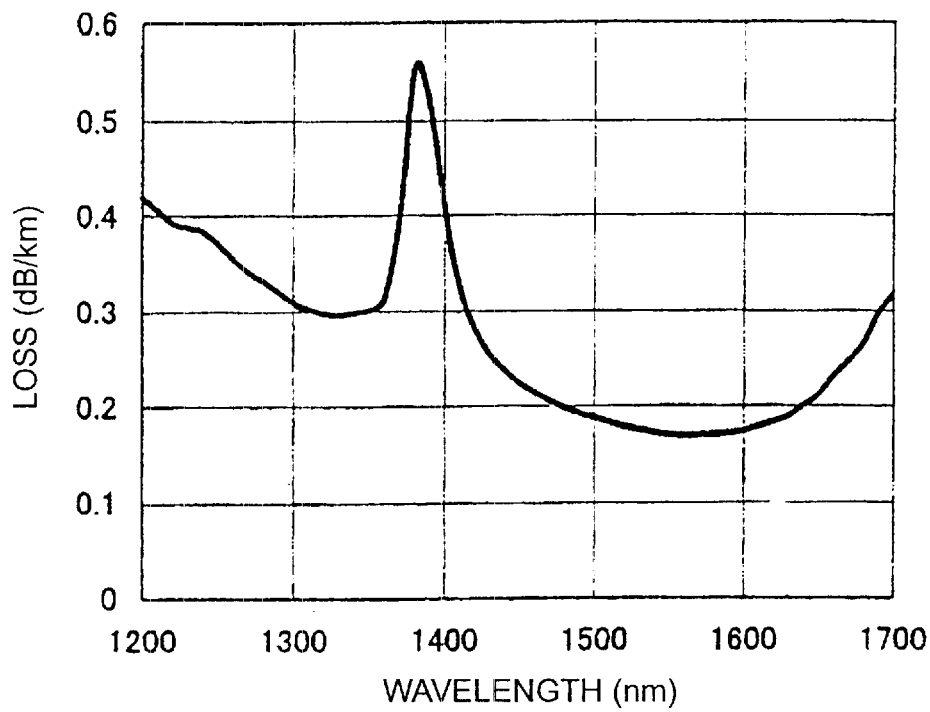
FIG. 2A is a graph showing a specific example of the relationship between transmisson loss of a pure silica core fiber and the wavelength of propagation light.
Figure 2B:
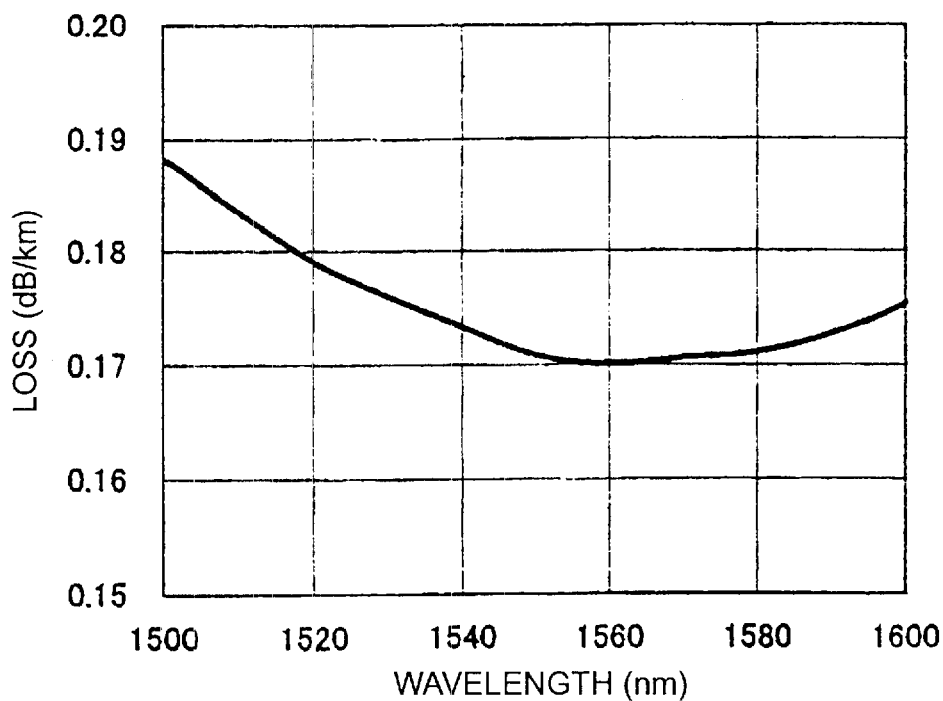
FIG. 2B is a graph showing the magnification of the part of FIG. 2A.

FIG. 2A is a graph showing a specific example of the relationship between transmisson loss of a pure silica core fiber and the wavelength of propagation light. FIG. 2B is a graph showing the magnification of the part of FIG. 2A. As shown in FIGS. 2A and 2B, transmission loss at the wavelength of 1,550 nm is preferably not more than 0.18 dB/km.

The single-mode optical fiber 11 preferably has an effective sectional area $A_{eff}$ of 100 $\mu$m$^2$ or more at the wavelength of 1,550 nm. In this case, the power density of propagation light can be suppressed, and degradation in waveform due to the nonlinear effect can be suppressed.

Table 1 shows the comparison result of loss and nonlinearity between four types of single-mode optical fibers 11: a normal single-mode optical fiber (GeSM) having a core region doped with GeO$_2$, a normal pure silica core fiber (PSCF), an $A_{eff}$-increased GeSM having an increased effective sectional area, and an $A_{eff}$-increased PSCF having an increased effective sectional area.

TABLE 1

| | Single-Mode Optical Fiber (SMF) | | | | Span Between Relays |
|---|---|---|---|---|---|
| | Loss [dB/km] | Dispersion $D_{SMF}$ [ps/nm/km] | Effective Sectional Area $A_{eff}$ [$\mu$m$^2$] | Nonlinear Refractive Index $n_{NL}$ [× 10$^{-20}$ m$^2$/W] | Equivalent Effective Sectional Area Equivalent $A_{eff}$ [$\mu$m$^2$] |
| GeSM | 0.185 | 17 | 80 | 3.0 | 50.7 |
| PSCF | 0.170 | 18 | 80 | 2.8 | 53.4 |
| $A_{eff}$-Increased GeSM | 0.185 | 17 | 100 | 3.0 | 57.4 |
| $A_{eff}$-Increased PSCF | 0.170 | 18 | 100 | 2.8 | 59.4 |

To calculate an equivalent effective sectional area (equivalent $A_{eff}$) in Table 1, an optical fiber having a loss of 0.270 dB/km, dispersion value $D_{DCF}$ of −39.2 ps/nm/km, dispersion slope $S_{DCF}$ of −0.060 ps/nm$^2$/km, effective sectional area $A_{eff}$ of 20.63 $\mu$m, and nonlinear refractive index $n_{NL}$ of 3.82×10$^{-20}$ m$^2$/W was used as the dispersion compensating optical fiber 12.

As shown in Table 1, When the GeSM is changed to the PSCF, the equivalent $A_{eff}$ can be increased by about 5%. In addition, when an optical fiber with increased $A_{eff}$ is used, the equivalent $A_{eff}$ can be further increased by about 10%. Hence, when the PSCF with increased $A_{eff}$ is used as the single-mode optical fiber 11, the nonlinearity of the optical transmission line 1 can be effectively reduced.

On the other hand, the dispersion compensating optical fiber 12 according to this embodiment has the dispersion value $D_{DCF}$ and dispersion slope $S_{DCF}$ within the ranges of $$-82 \leq D_{DCF} \leq -29 \quad (3a)$$

$$0.0023 \times D_{DCF} \leq S_{DCF} \leq 0.033 + 0.0015 \times D_{DCF} \quad (3b)$$

More preferably, the dispersion value $D_{DCF}$ falls within the range of $-82 \leq D_{DCF} \leq -36$. The reason why this range is preferable will be described later.

The leading wavelength of the dispersion compensating optical fiber 12 according to this embodiment falls within the range of 1,565 to 1,700 nm and, more preferably, 1,620 to 1,700 nm. The reason why this range is preferable will be described later.

Figure 3A:
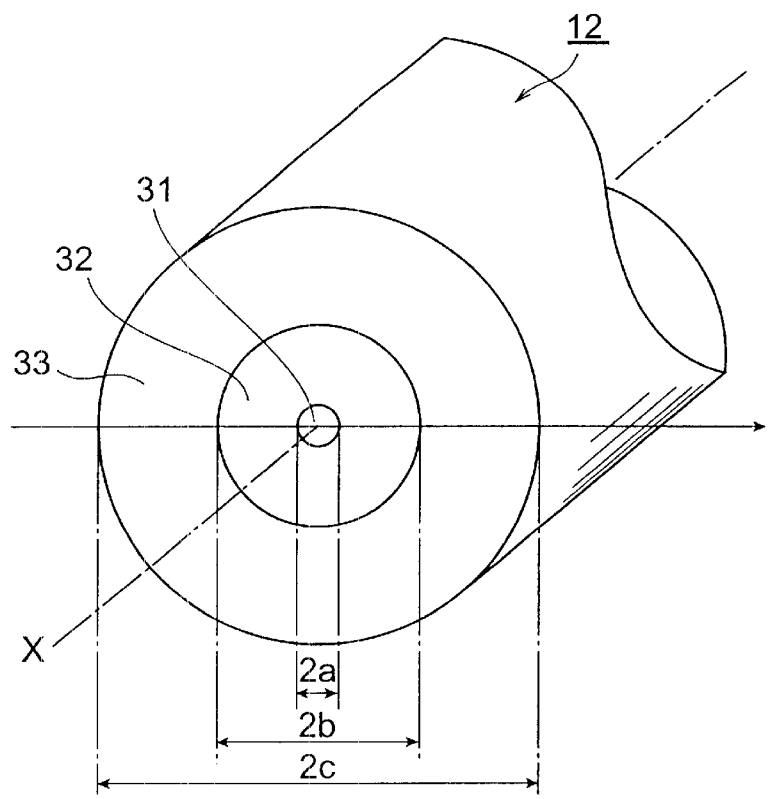
FIG. 3A is a sectional view schematically showing the structure of a dispersion compensating optical fiber according to this embodiment.
Figure 3B:
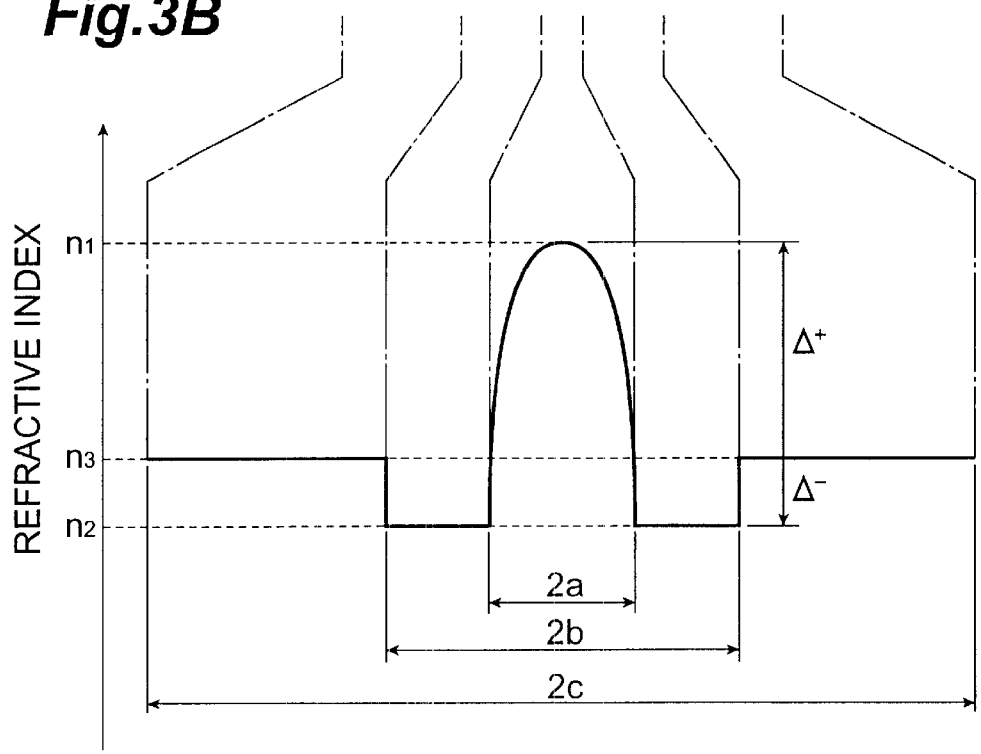
FIG. 3B is a view showing the refractive index profile of the dispersion compensating optical fiber shown in FIG. 3A.

FIG. 3A is a sectional view schematically showing the structure of the dispersion compensating optical fiber 12 according to this embodiment. FIG. 3B is a view showing the refractive index profile of the dispersion compensating optical fiber 12. As shown in FIGS. 3A and 3B, the dispersion compensating optical fiber 12 has a core region 31 including an optical axis center x and having a refractive index $n_1$, a first cladding region 32 surrounding the core region 31 and having a refractive index $n_2$, and a second cladding region 33 surrounding the first cladding region 32 and having a refractive index $n_3$. A relationship $n_1 > n_3 > n_2$ holds between the refractive indices. The dispersion compensating optical fiber 12 with such a structure can be implemented using silica glass as a base by, e.g., doping $GeO_2$ in the core region 31 and F in the first cladding region 32. A relative refractive index difference $\Delta^+$ of the core region 31 to the second cladding region 33 preferably falls within the range of 1.3% to 1.7%, and a relative refractive index difference $\Delta^-$ of the first cladding region 32 to the second cladding region 33 preferably falls within the range of $-0.5\%$ to $-0.2\%$.

The relative refractive index difference $\Delta^+$ of the core region 31 to the second cladding region 33 and the relative refractive index difference $\Delta^-$ of the first cladding region 32 to the second cladding region 33 are defined by $$\Delta^+ = (n_1 - n_3)/n_3$$

$$\Delta^- = (n_2 - n_3)/n_3$$

where $n_1$ is the refractive index of the core region 31, $n_2$ is the refractive index of the first cladding region 32, and $n_3$ is the refractive index of the second cladding region 33. In this specification, the relative refractive index difference is represented in percentage, and the refractive indices of the respective regions in the above definitions are not in order. Hence, when the relative refractive index difference has a negative value, the corresponding region has a refractive index lower than that of the second cladding region 33.

A nonlinear index $\Delta\phi$ of the optical transmission line is defined as follows. More specifically, the nonlinear index $\Delta\phi$ is obtained by integrating the phase modulation factor by self-phase modulation, i.e., a kind of nonlinear phenomenon across the total length of the optical transmission line and given by $$\Delta\phi = K \frac{2\pi}{\lambda} \int_0^L \frac{n_{NL}(z)}{A_{\mathit{eff}}(z)} P(z) dz \qquad (4a)$$

where $\lambda$ is the wavelength of light. $A_{\mathit{eff}}(z)$ is the effective sectional area and given by $$A_{\mathit{eff}} = 2\pi \left( \int_0^\infty E^2 r\, dr \right)^2 \Big/ \left( \int_0^\infty E^4 r\, dr \right) \qquad (5)$$

where E is the electric field accompanying the propagation light, and r is the radial distance from the core center.

In equation (4a), $n_{NL}$ is the nonlinear refractive index. The refractive index $<N>$ of a medium under strong light changes depending on the light intensity. Hence, the effect of lowest degree for the refractive index $<N>$ is $$<N> = <N0> + <N2> \cdot |E|^2$$

where $<N0>$: refractive index for linear polarization $\leq N2>$: 2nd-order nonlinear refractive index for 3rd-order nonlinear polarization $|E|^2$: light intensity That is, under strong light, the refractive index $<N>$ of the medium is given by the sum of the normal value $<N0>$ and an increment proportional to the square of the optical field amplitude E. Especially, the proportional constant $<N2>$ (unit: $m^2/W$) of the second term is called a 2nd-order nonlinear refractive index. Additionally since distortion in signal light pulse is mainly affected by the 2nd-order nonlinear refractive index in nonlinear refractive indices, a nonlinear refractive index in this specification mainly means this 2nd-order nonlinear refractive index.

In equation (4b), P(z) is the power of light, and $\alpha$ is the transmission loss in the optical transmission line.

The effective sectional area $A_{\mathit{eff}}(z)$, nonlinear refractive index $n_{NL}(z)$, and power P(z) are functions of a variable z indicating a position on the optical transmission line. $P_0$ is defined to obtain a predetermined power at the exit end of an optical transmission line with a predetermined length. A proportional coefficient k is defined such that the nonlinear index $\Delta\phi$ of the single-mode optical fiber (an optical fiber having a core made of pure silica and a cladding made of F-doped silica) has a value "1".

The nonlinear index $\Delta\phi$ defined so is 2.1 in a dispersion shift optical fiber (NZ-DSF) having a zero dispersion wavelength on the long wavelength side of 1,550 nm. As the value of nonlinear index $\Delta\phi$ increases, the nonlinear optical phenomenon readily occurs. As the value of nonlinear index $\Delta\phi$ becomes small, the nonlinear optical phenomenon hardly occurs. Hence, the value of nonlinear index $\Delta\phi$ in the optical transmission line is preferably as small as possible.

An equivalent effective sectional area (Equivalent $A_{\mathit{eff}}$) is defined by $$\text{Equivalent } A_{\mathit{eff}} = A_{\mathit{eff}}(DSF) \times \Delta\phi(DSF)/\Delta\phi$$

where $\Delta\phi$ is the nonlinear index in the optical transmission line above mentioned, $\Delta\phi(DSF)$ is the nonlinear index in the optical transmission line formed only by NZ-DSF and $A_{\mathit{eff}}(DSF)$ is an effective sectional area of NZ-DSF. The value of Equivalent $A_{\mathit{eff}}$ is preferably as large as possible.

A dispersion slope compensating ratio $\eta$ is defined by $$\eta = 100 \times (S_{DCF}/D_{DCF})/(S_{SMF}/D_{SMF}) \qquad (6)$$

When the dispersion slope compensating ratio $\eta$ is 100%, both the dispersion value $D_{total}$ and dispersion slope $S_{total}$ in the entire optical transmission line 1 can be nullified by appropriately setting the DCF ratio R. When the dispersion slope compensating ratio $\eta$ is lower than 100%, both the dispersion value $D_{total}$ and dispersion slope $S_{total}$ in the entire optical transmission line 1 cannot be simultaneously nullified: when the dispersion value $D_{total}$ is zero, the dispersion slope $S_{total}$ is not zero.

In the optical transmission line 1 shown in FIG. 1, the dispersion value $D_{DCF}$, dispersion slope $S_{DCF}$, effective sectional area $A_{\mathit{eff}}$, and nonlinear refractive index $n_{NL}$ of the dispersion compensating optical fiber 12 were calculated for each value of relative refractive index difference $\Delta^+$ of the core region 31 of the dispersion compensating optical fiber 12 such that the bending loss (bending diameter: 20 mmø, and wavelength: 1,550 nm) become 2 dB/m. In addition, the loss in dispersion compensating optical fiber 12 was calculated by obtaining the $\Delta^+$ dependence from the past record and interpolating it, and the transmission loss and nonlinear index Δø of the entire optical transmission line 1 at that time were calculated.

Figure 4:
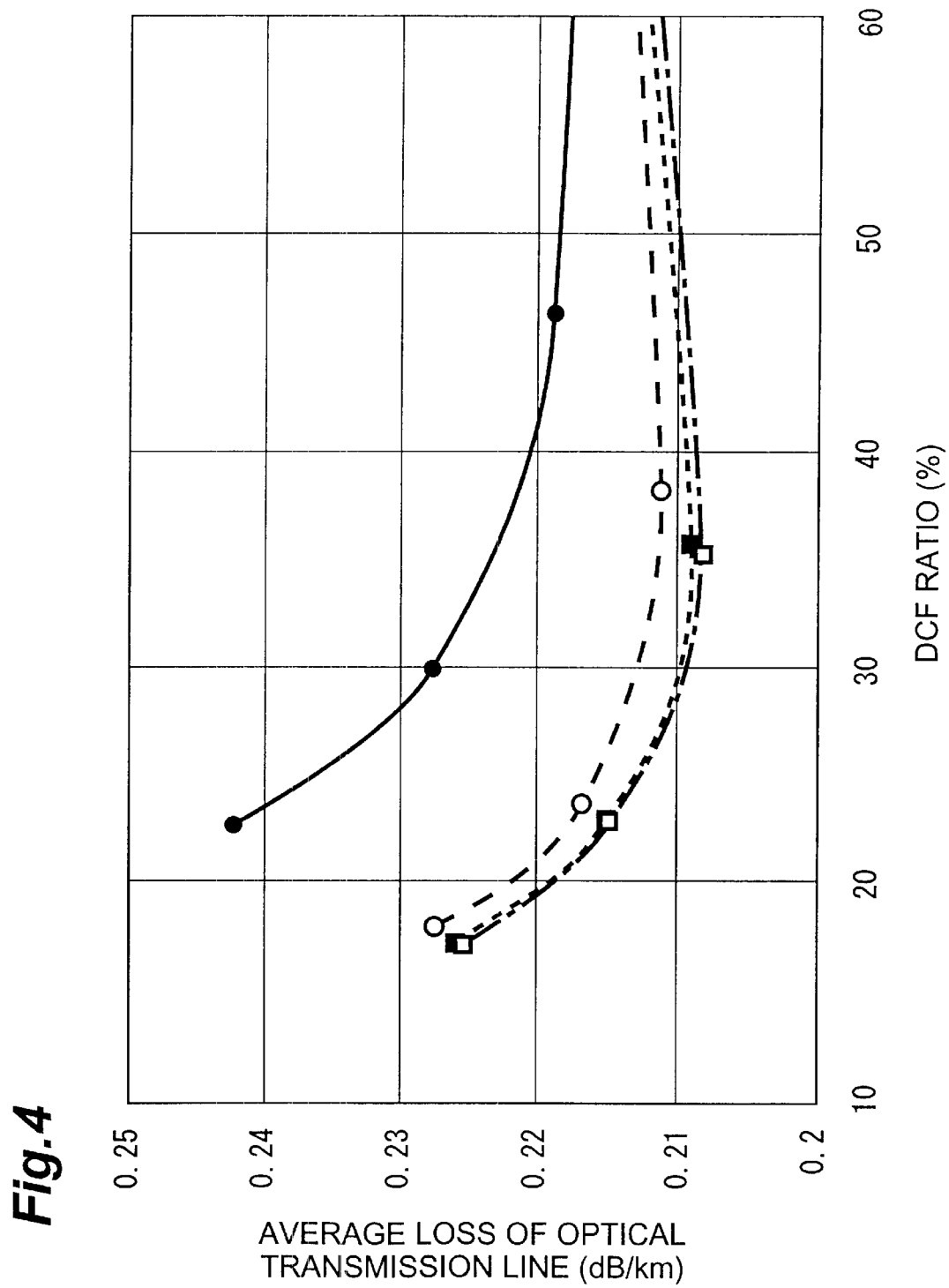
FIG. 4 is a graph showing the relationship between a DCF ratio R and the transmission loss of the entire optical transmission line.
Figure 5:
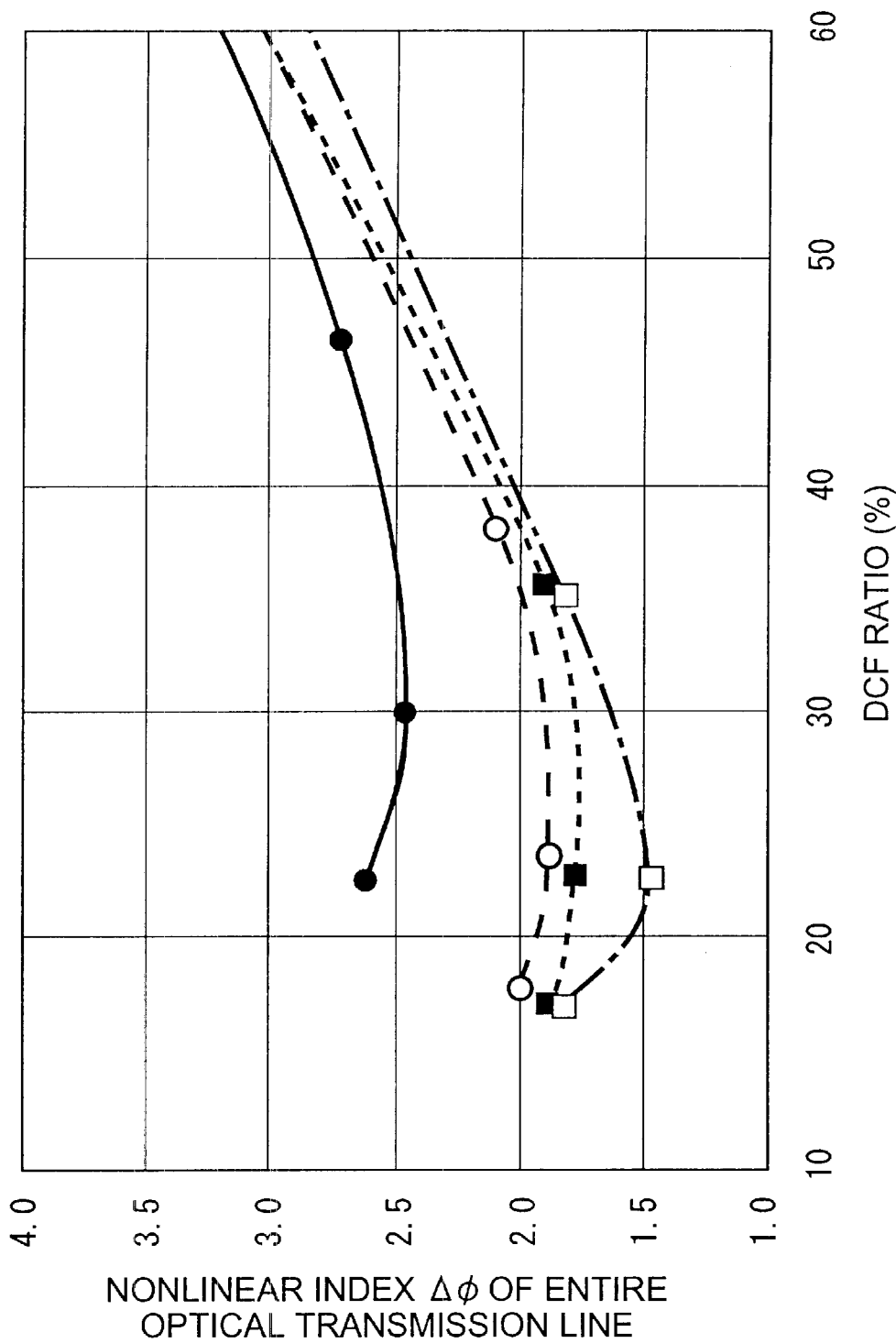
FIG. 5 is a graph showing the relationship between the DCF ratio R and a nonlinear index Δø of the entire optical transmission line.
Figure 6:
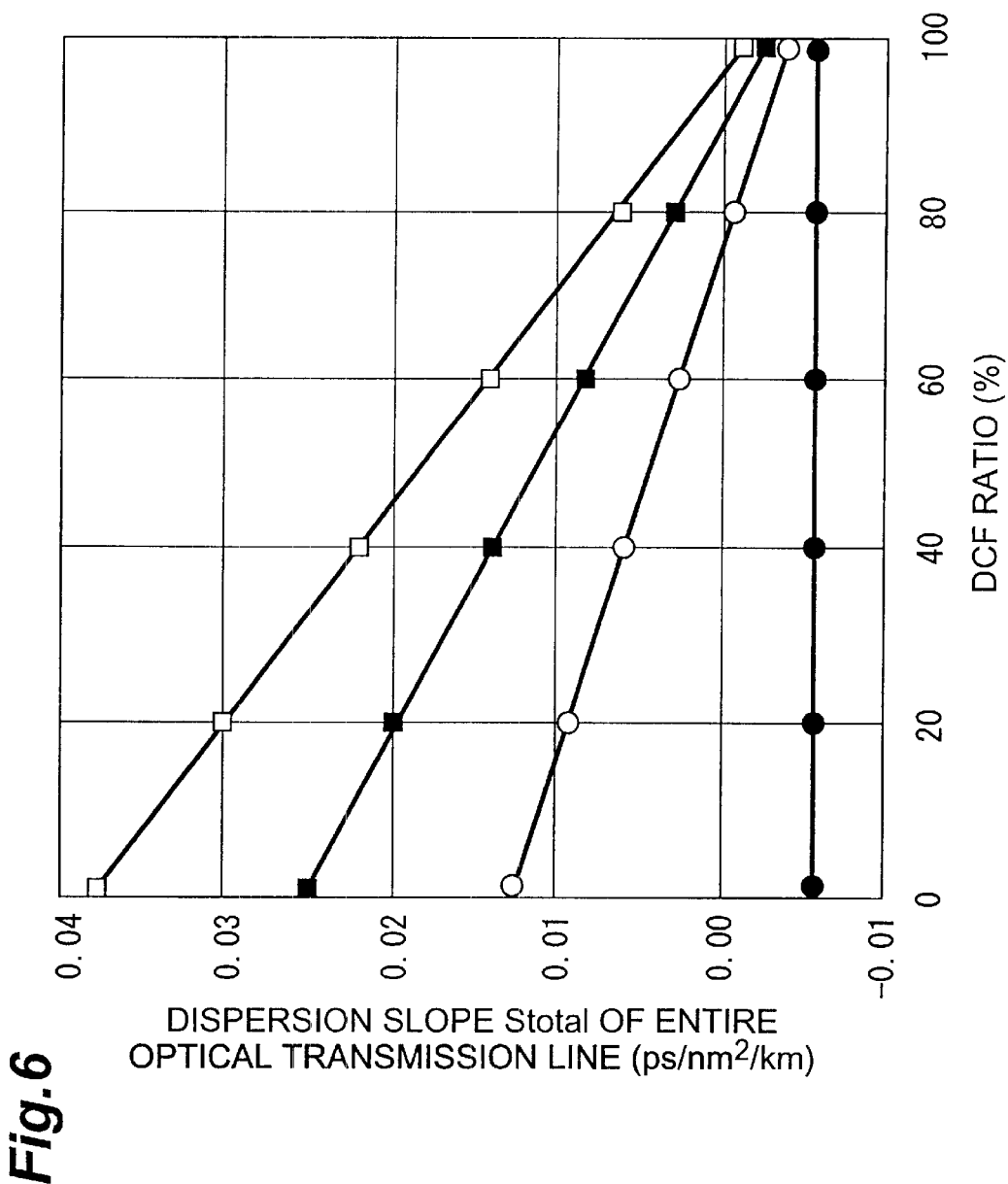
FIG. 6 is a graph showing the relationship between the DCF ratio R and a dispersion slope $S_{total}$ of the entire optical transmission line.

FIG. 4 is a graph showing the relationship between the DCF ratio R and the transmission loss of the entire optical transmission line 1. FIG. 5 is a graph showing the relationship between the DCF ratio R and the nonlinear index Δø of the entire optical transmission line 1. FIG. 6 is a graph showing the relationship between the DCF ratio R and the dispersion slope $S_{total}$ of the entire optical transmission line 1. In the graphs shown in FIGS. 4 to 6, the dispersion slope compensating ratio η is changed to 30% (indicated by hollow square bullets), 50% (indicated by solid square bullet), 70% (indicated by hollow bullets), and 100% (indicated by solid bullets).

Figure 7:
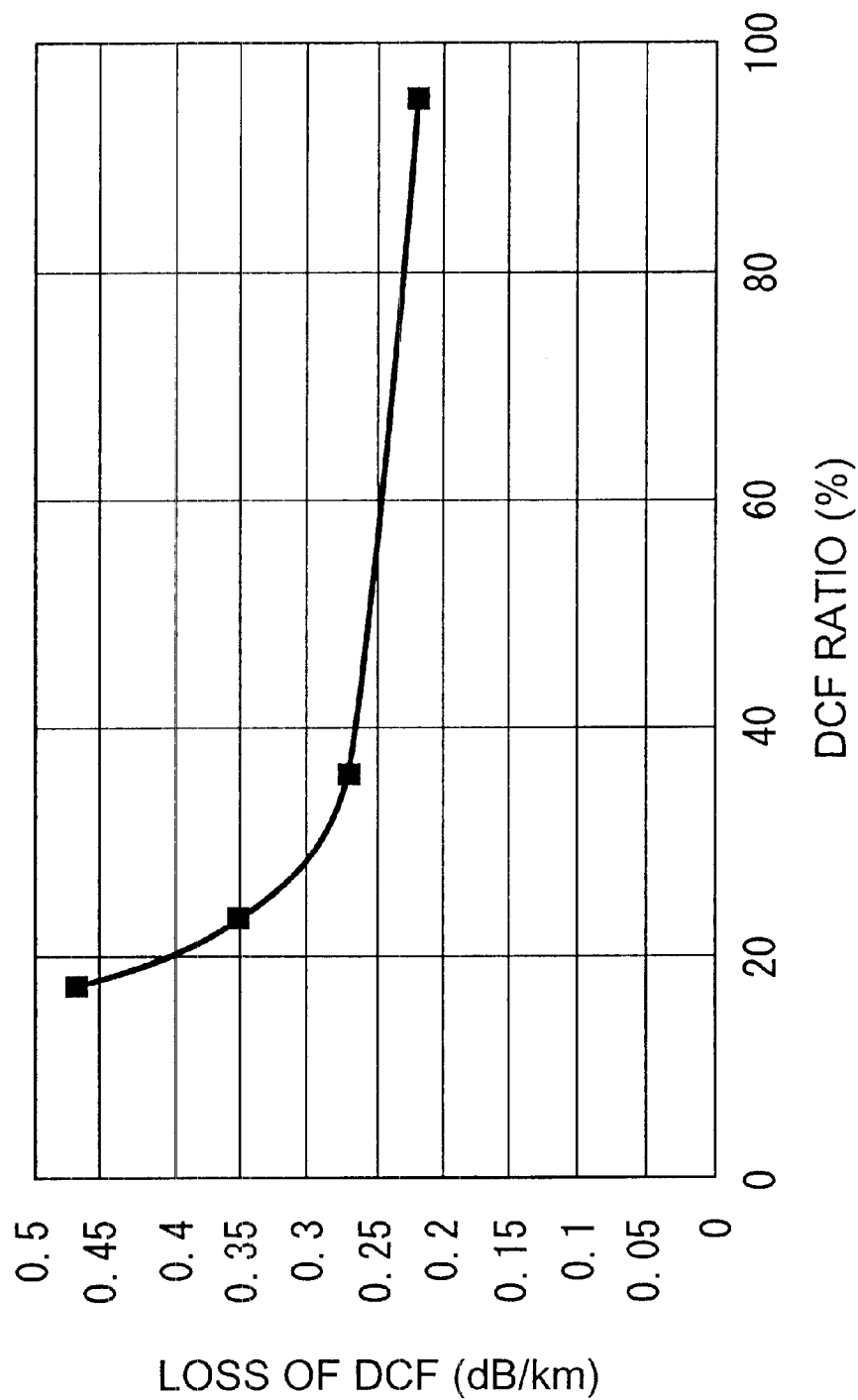
FIG. 7 is a graph showing the relationship between the DCF ratio R and the transmission loss of the dispersion compensating optical fiber.
Figure 8:
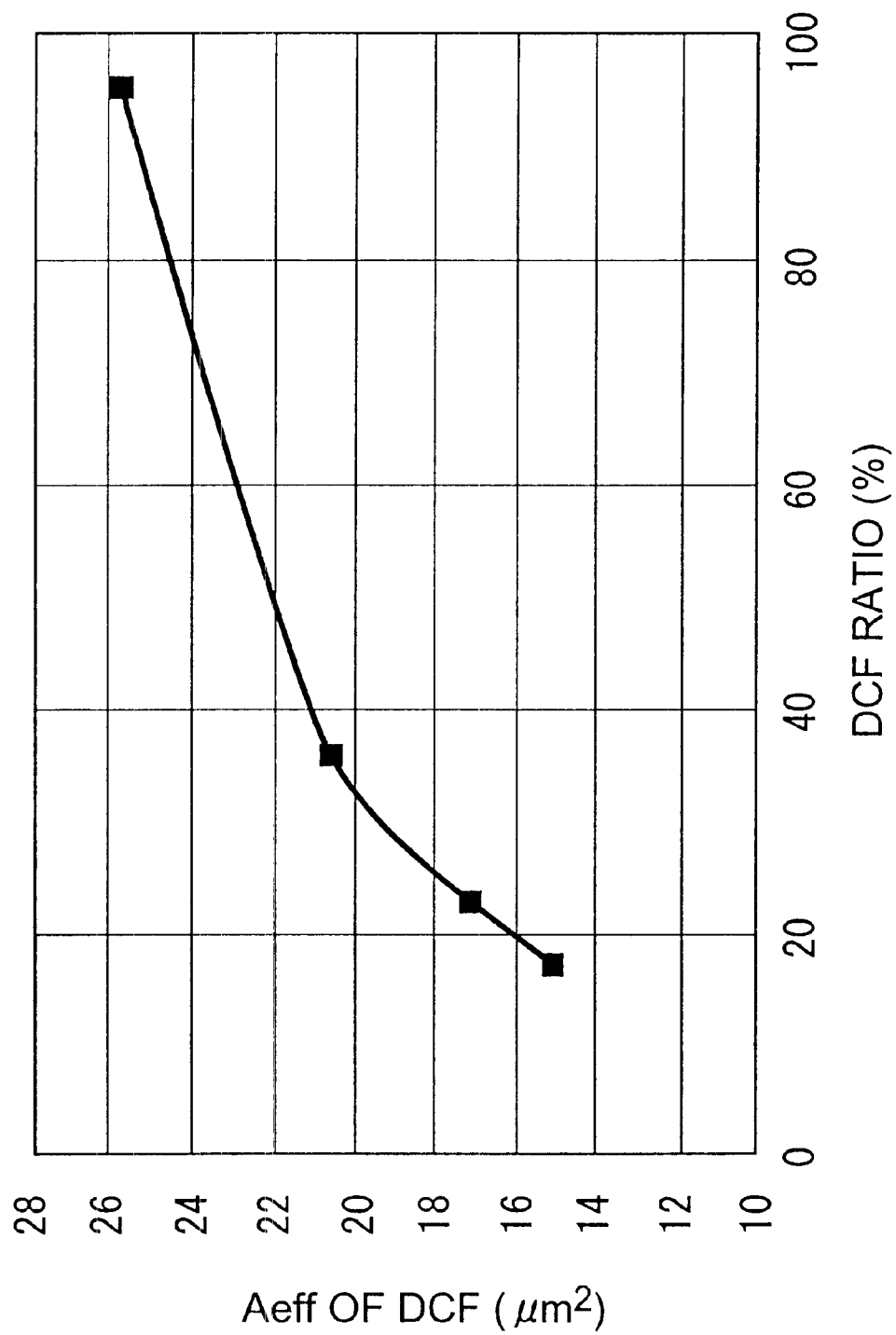
FIG. 8 is a graph showing the relationship between the DCF ratio R and an effective sectional area $A_{eff}$ of the dispersion compensating optical fiber.
Figure 9:
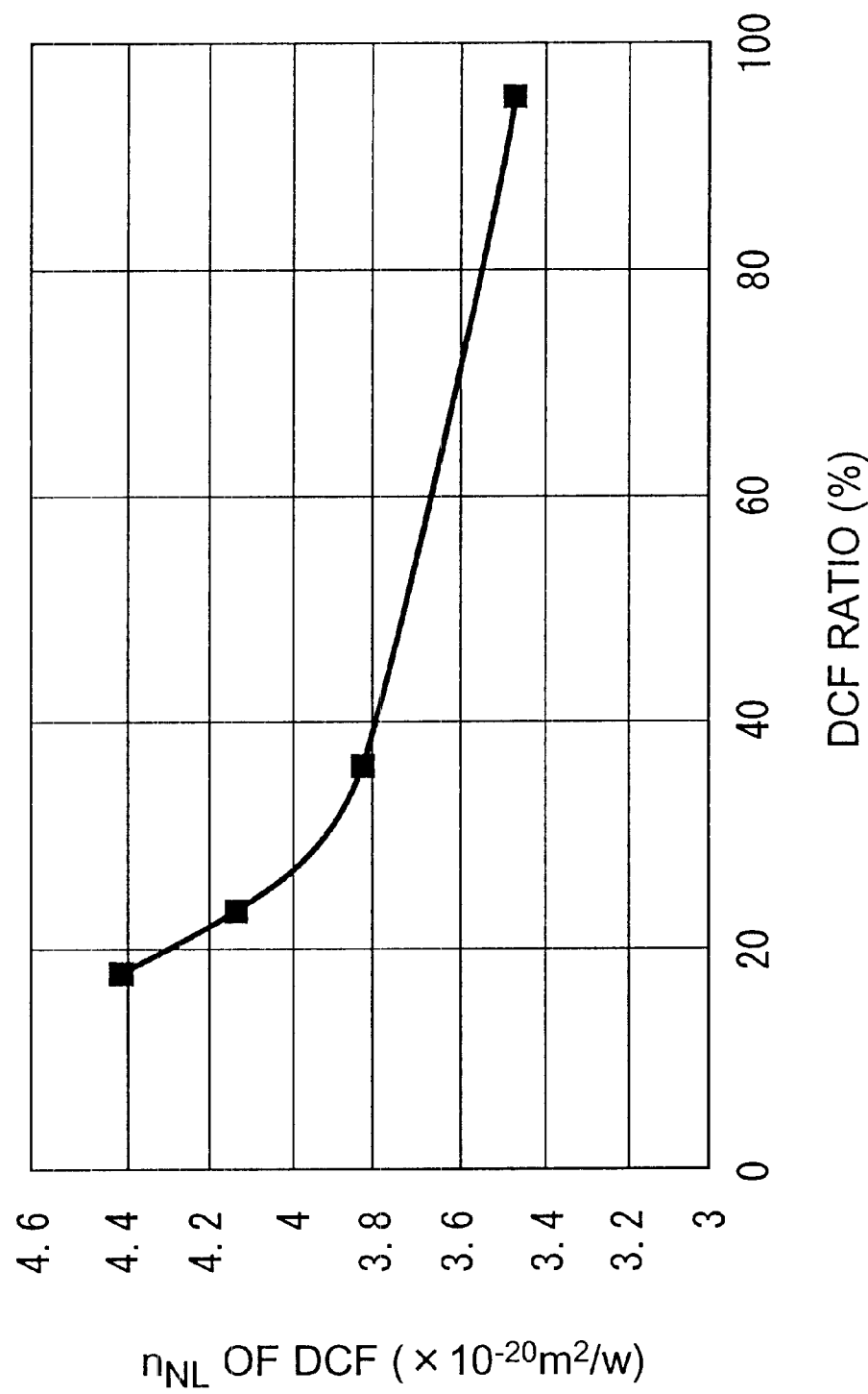
FIG. 9 is a graph showing the relationship between the DCF ratio R and a nonlinear refractive index $n_{NL}$ of the dispersion compensating optical fiber.

FIG. 7 is a graph showing the relationship between the DCF ratio R and the transmission loss of the dispersion compensating optical fiber 12. FIG. 8 is a graph showing the relationship between the DCF ratio R and the effective sectional area $A_{eff}$ of the dispersion compensating optical fiber 12. FIG. 9 is a graph showing the relationship between the DCF ratio R and the nonlinear refractive index $n_{NL}$ of the dispersion compensating optical fiber 12. In the graphs shown in FIGS. 7 to 9, the dispersion slope compensating ratio η is 50%, and the bending loss (bending diameter: 20 mmø, and wavelength: 1,550 nm) is 2 dB/m.

As the single-mode optical fiber 11, an $A_{eff}$-increased pure silica core fiber ($A_{eff}$-increased PSCF) having a core made of pure silica and a cladding made of F-doped silica was used. In this $A_{eff}$-increased PSCF, the transmission loss was 0.175 dB/km, the effective sectional area $A_{eff}$ was 110 $\mu m^2$, the nonlinear refractive index $n_{NL}$ was $2.8 \times 10^{-20}$ m$^2$/W, the dispersion value $D_{SMF}$ was 18.7 ps/nm/km, and the dispersion slope $S_{SMF}$ was 0.057 ps/nm/km.

As is apparent from the graphs shown in FIGS. 4 and 5, as the dispersion slope compensating ratio η becomes low, the transmission loss of the entire optical transmission line 1 decreases, and the nonlinear index Δø of the entire optical transmission line 1 also decreases. More specifically, to reduce both the transmission loss and nonlinear index of the entire optical transmission line 1, the dispersion slope compensating ratio η is preferably as low as possible. The upper limit of the preferable range of the dispersion slope compensating ratio η is preferably 80% and, more preferably, 70%. On the other hand, as is apparent from the graph shown in FIG. 6, as the dispersion slope compensating ratio η becomes low, the residual dispersion slope $S_{total}$ of the entire optical transmission line 1 when the dispersion value $D_{total}$ of the entire optical transmission line 1 is almost zero increases. To reduce the dispersion slope $S_{total}$ of the entire optical transmission line 1, the dispersion slope compensating ratio η is preferably as high as possible. The lower limit of the preferable range of the dispersion slope compensating ratio η is preferably 20% and, more preferably, 30%. Hence, the preferable range of the dispersion slope compensating ratio η is 20% (more preferably, 30%) to 80% (more preferably, 70%).

As is apparent from the graphs shown in FIGS. 7 to 9, when the dispersion slope compensating ratio η is 50%, the higher the DCF ratio is, the smaller the transmission loss of the dispersion compensating optical fiber 12 is. In addition, the higher the DCF ratio R is, the larger the effective sectional area $A_{eff}$ of the dispersion compensating optical fiber 12 is. Furthermore, since the nonlinear refractive index $n_{NL}$ of the dispersion compensating optical fiber 12 is low, the nonlinear optical phenomenon hardly occurs in the dispersion compensating optical fiber 12. However, since the ratio R of the dispersion compensating optical fiber 12 having a loss larger than that of the single-mode optical fiber 11 becomes high, the transmission loss and nonlinear index Δø of the entire optical transmission line 1 have dependence on the DCF ratio R, as will be described below.

As is apparent from the graphs shown in FIGS. 4 and 5, when the dispersion slope compensating ratio η is 80% or less, the transmission loss of the entire optical transmission line 1 is small in the region where the DCF ratio R is 20% or more (more preferably, 25% or more). On the other hand, when the DCF ratio R is 40% or less (more preferably, 35% or less), the nonlinear index Δø of the entire optical transmission line 1 is low. To reduce both the transmission loss and nonlinear index of the entire optical transmission line 1, the DCF ratio R preferably falls within the range of 20% (more preferably, 25%) to 40% (more preferably, 35%). When the dispersion value $D_{DCF}$ and dispersion slope $S_{DCF}$ of the dispersion compensating optical fiber 12 satisfy equations (3a) and (3b), the preferable ranges of the dispersion slope compensating ratio η and DCF ratio R of the optical transmission line 1 are satisfied.

Figure 10:
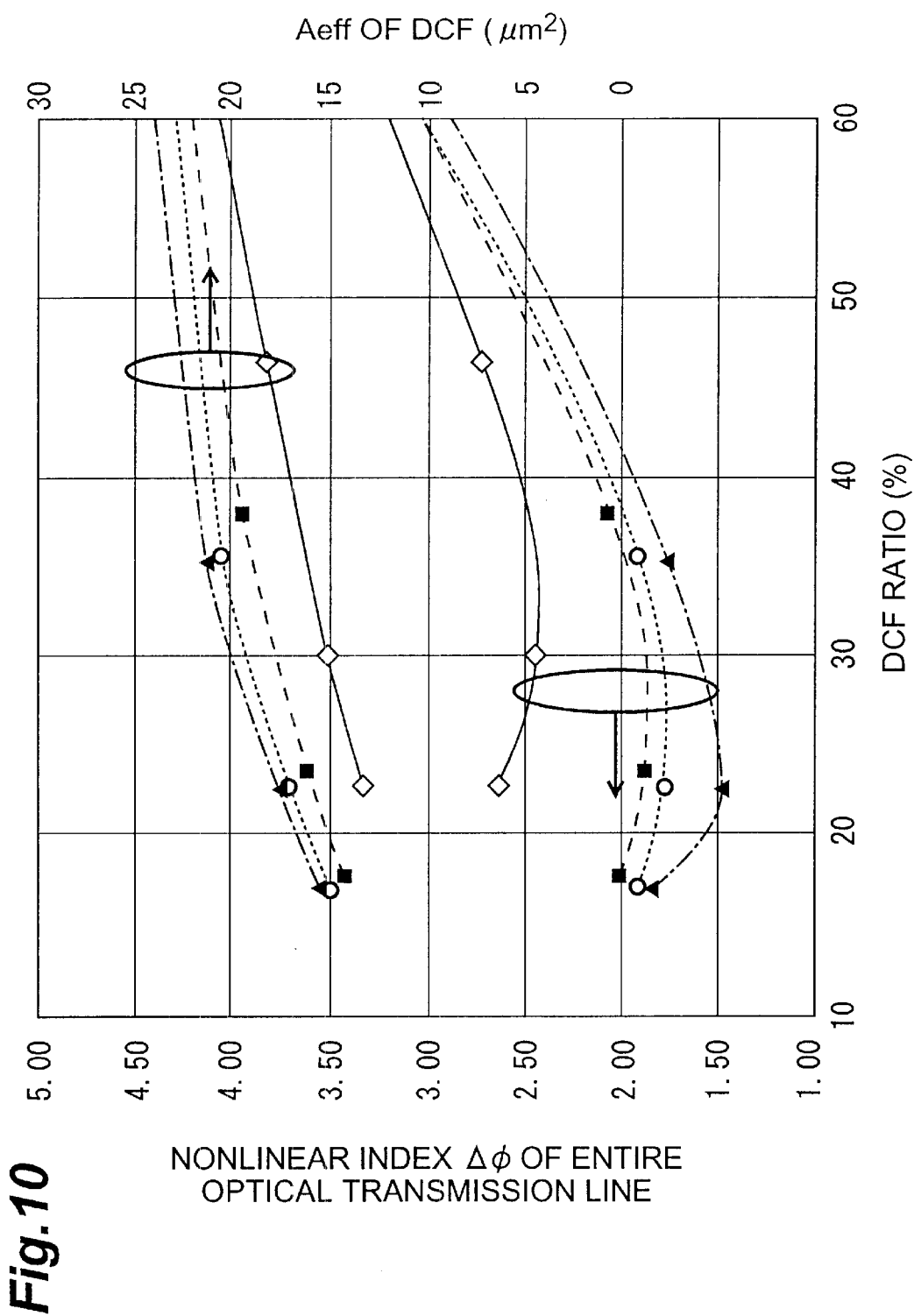
FIG. 10 is a graph showing the relationship between the DCF ratio R and the nonlinear index Δø of the entire optical transmission line and the relationship between the DCF ratio R and the effective sectional area $A_{eff}$ of the dispersion compensating optical fiber.

FIG. 10 is a graph showing the relationship between the DCF ratio R and the nonlinear index Δø of the entire optical transmission line 1 and the relationship between the DCF ratio R and the effective sectional area $A_{eff}$ of the dispersion compensating optical fiber 12. Referring to FIG. 10, the dispersion slope compensating ratio η is changed to 30% (indicated by hollow square bullets), 50% (indicated by solid square bullet), 70% (indicated by hollow bullets), and 100% (indicated by solid bullets). As is apparent from this graph, the higher the DCF ratio R becomes, the larger the effective sectional area $A_{eff}$ of the dispersion compensating optical fiber 12 becomes. In the above-described preferable ranges of the dispersion slope compensating ratio η (20% to 80%) and DCF ratio R (20% to 40%), the effective sectional area $A_{eff}$ of the dispersion compensating optical fiber 12 is 14 $\mu m^2$ or more.

The reason why the preferable ranges of the dispersion value $D_{DCF}$ and dispersion slope $S_{DCF}$ of the dispersion compensating optical fiber 12 according to this embodiment at the wavelength of 1,550 nm are represented by equations (3a) and (3b) will be described next.

To obtain the preferable ranges of the dispersion value $D_{DCF}$ and dispersion slope $S_{DCF}$, an optical fiber having the refractive index profile shown in FIGS. 2A and 2B was used as the dispersion compensating optical fiber 12 of the optical transmission line 1. The relative refractive index difference Δ between the first cladding region 32 and the second cladding region 33 was fixed to −0.36%. Under this condition, the relative refractive index difference Δ$^+$ between the core region 31 and the second cladding region 33, a diameter 2a of the core region 31, and a ratio $R_a$ (=2a/2b) of the diameter of the core region 31 to an outer diameter 2b of the first cladding region 32 were changed as parameters whereby the optimum design of the dispersion compensating optical fiber 12 was examined.

First, the dispersion value, dispersion slope, and effective sectional area $A_{eff}$ when the leading wavelength of the dispersion compensating optical fiber was fixed were calculated while changing the relative refractive index difference Δ$^+$, and the nonlinear index at each relative refractive index difference Δ$^+$ was calculated on the basis of equations (4a) and (4b). As the single-mode optical fiber 11, an $A_{eff}$-increased pure silica core fiber ($A_{eff}$-increased PSCF) having a core made of pure silica and a cladding made of F-doped silica was used. In this $A_{eff}$-increased PSCF, the transmission loss was 0.175 dB/km, the effective sectional area $A_{eff}$ was 110 $\mu m^2$, the nonlinear refractive index $n_{NL}$ was $2.8\times10^{-20}$ m²/W, the dispersion value $D_{SMF}$ was 18.7 ps/nm/km, and the dispersion slope $S_{SMF}$ was 0.057 ps/nm²/km.

As for the arrangement of the optical transmission line 1, one span was set to 50 km, and the average dispersion in each span was −2 ps/nm/km, thereby determining the lengths of the single-mode optical fiber 11 and dispersion compensating optical fiber 12. The average transmission loss and average dispersion slope were average values in the entire optical transmission line 1 between stations (relays 21 and 22 in FIG. 1). Under these conditions, the nonlinear index was calculated on the basis of equation (4a).

Figure 11:
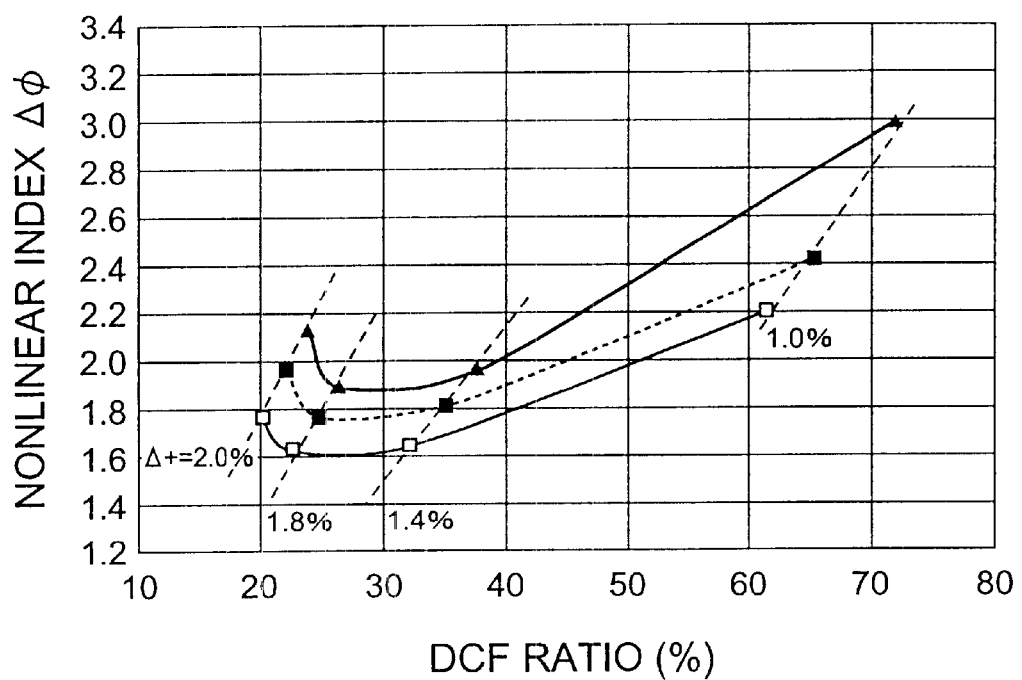
FIG. 11 is a graph showing the relationship between the DCF ratio R and the nonlinear index Δø of the entire optical transmission line when the leading wavelength is 1,650 nm.

FIG. 11 is a graph showing the relationship between the DCF ratio R and the nonlinear index Δø of the entire optical transmission line when the leading wavelength is 1,650 nm. Referring to FIG. 11, the dispersion slope compensating ratio η is changed to 30% (indicated by hollow square bullets), 50% (indicated by solid square bullet), and 60% (indicated by solid triangles). As shown in FIG. 11, when the DCF ratio R is about 25%, the nonlinear index is minimum, and the nonlinearity in the optical transmission line 1 is minimum. The preferable range of the DCF ratio R capable of suppressing the nonlinearity is 0.2 to 0.4. When the average dispersion in each span is −2 to −1 ps/nm/km, the preferable range of the dispersion value $D_{DCF}$ of the dispersion compensating optical fiber, which is calculated from equation (2a), is $$-82 \leq D_{DCF} \leq -29$$

This dispersion compensating optical fiber 12 is preferable for long-distance large-capacity transmission because the nonlinear index of the entire optical transmission line 1 can be sufficiently suppressed when the optical transmission line is formed by connecting the dispersion compensating optical fiber 12 to the single-mode optical fiber 11. The reason why the range of −2 to −1 ps/nm/km is selected as the average dispersion between these stations 21 and 22 is that the modulation instability can be suppressed by the negative value and degradation in signal waveform due to interphase modulation as a nonlinear effect can be suppressed.

When the DCF ratio R is 0.2∘0.35, the preferable range of the dispersion value $D_{DCF}$ of the dispersion compensating optical fiber 12 is $$-82 \leq D_{DCF} \leq -36$$

This reduces the nonlinearity of the dispersion compensating optical fiber 12 and further decreases the nonlinear index Δø of the optical transmission line 1 itself. Since the nonlinearity of the optical transmission line 1 itself is larger than that of the single-mode optical fiber 11, the nonlinearity of the entire optical transmission line 1 becomes large when the dispersion compensating optical fiber 12 is long. Hence, when the DCF ratio is reduced, the nonlinearity of the entire optical transmission line 1 can be made small.

When equation (2b) is used, the preferable range of the dispersion slope $S_{DCF}$ of the dispersion compensating optical fiber 12 can be obtained on the basis of the dispersion slope $S_{total}$ of the entire optical transmission line 1, the dispersion slope $S_{SMF}$ of the single-mode optical fiber, and the DCF ratio R. More specifically, since the dispersion slope $S_{total}$ of the entire optical transmission line 1 is preferably 0.03 ps/nm²/km, $$S_{DCF} \leq \{0.03 - (1-R)S_{SMF}\}/R \tag{7}$$

Substitutions of R of equation (2a), $D_{SMF}$=18 ps/nm/km, and $S_{MFS}$=0.06 ps/nm/km into equation (7) yield $$S_{DCF} \leq \{0.06 \cdot D_{total} - 0.03 \cdot (D_{DCF}+18)\}/\{D_{total}-18\} \tag{8}$$

Assuming that $-2 \leq D_{total} \leq -1$, the upper limit value of $S_{DCF}$ is obtained when $D_{total}$=−2 ps/nm/km. This defines the upper limit of the dispersion slope $S_{DCF}$ of the dispersion compensating optical fiber 12 in equation (3b).

A dispersion shift optical fiber (NZ-DSF, transmission loss=0.21 dB/km, effective sectional area $A_{eff}$=55 μm², and nonlinear refractive index $n_{NL}$=3.2×10⁻²⁰ m²/W) having the zero dispersion wavelength on the long wavelength side of 1,550 nm and used for submarine cable has a nonlinear index Δø of about 2.1. For a nonlinear index Δø smaller than 2.1, the dispersion slope compensating ratio η defined by equation (6) must be 70% or less (FIG. 5). When $D_{SMF}$=18 ps/nm/km and $S_{SMF}$=0.06 ps/nm²/km are substituted into the inequality under η≤70%, the lower limit of the dispersion slope $S_{DCF}$ of the dispersion compensating optical fiber 12 in equation (3b) is defined.

The preferable range of a loss $\alpha_{DCF}$ of the dispersion compensating optical fiber 12 is obtained in the following way. Letting $\alpha_{SMF}$ be the loss of the single-mode optical fiber, an average loss $\alpha_{total}$ of the entire optical transmission line 1 is given by $$\alpha_{total}=(1-R)\alpha_{SMF}+R \cdot \alpha_{DCF} \tag{9}$$

Since the loss $\alpha_{SMF}$ is preferably about 0.175 dB/km, and the average loss $\alpha_{total}$ is preferably 0.24 dB/km or less, the loss $\alpha_{DCF}$ of the dispersion compensating optical fiber 12 is preferably 0.5 dB/km or less. In addition, since the average loss $\alpha_{total}$ is more preferably 0.22 dB/km or less, the loss $\alpha_{DCF}$ of the dispersion compensating optical fiber 12 is more preferably 0.4 dB/km or less.

Figure 12:
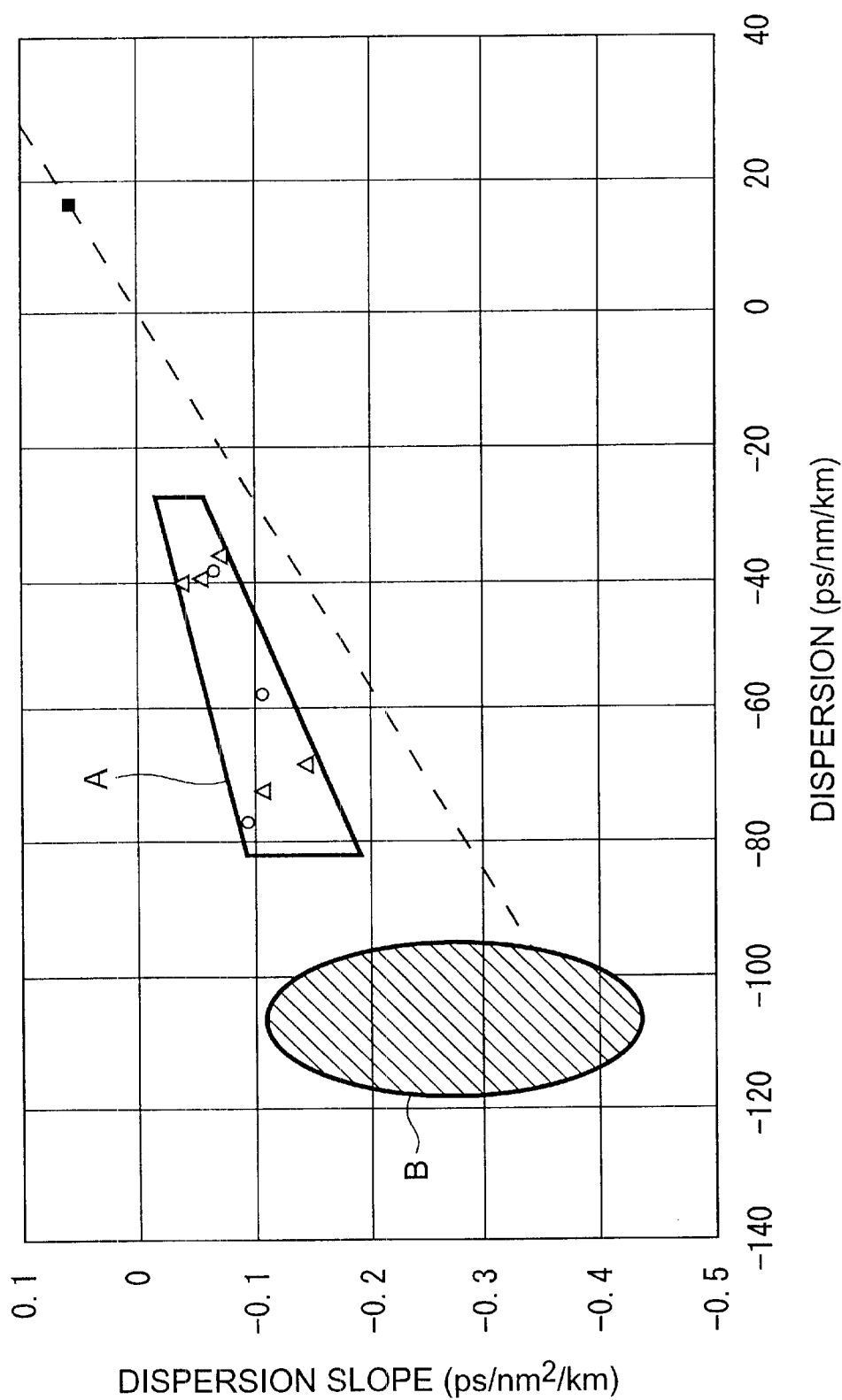
FIG. 12 is a graph showing the preferable range of a dispersion value $D_{DCF}$ and dispersion slope $S_{DCF}$ of the dispersion compensating optical fiber according to this embodiment.

FIG. 12 is a graph showing the preferable ranges (region A indicated by a rectangle) of the dispersion value $D_{DCF}$ and dispersion slope $S_{DCF}$ of the dispersion compensating optical fiber 12 according to this embodiment at the wavelength of 1,550 nm. In this graph, the range (region B indicated by an ellipse) of the dispersion value and dispersion slope of a conventional dispersion compensating optical fiber at the wavelength of 1,550 nm, and the dispersion value and dispersion slope (indicated by a solid square bullet) of the single-mode optical fiber (SMF) are also shown. This graph also shows the dispersion values and dispersion slopes (indicated by hollow bullets and hollow triangles) of eight examples (to be described later) of the dispersion compensating optical fiber 12 according to this embodiment.

Figure 13:
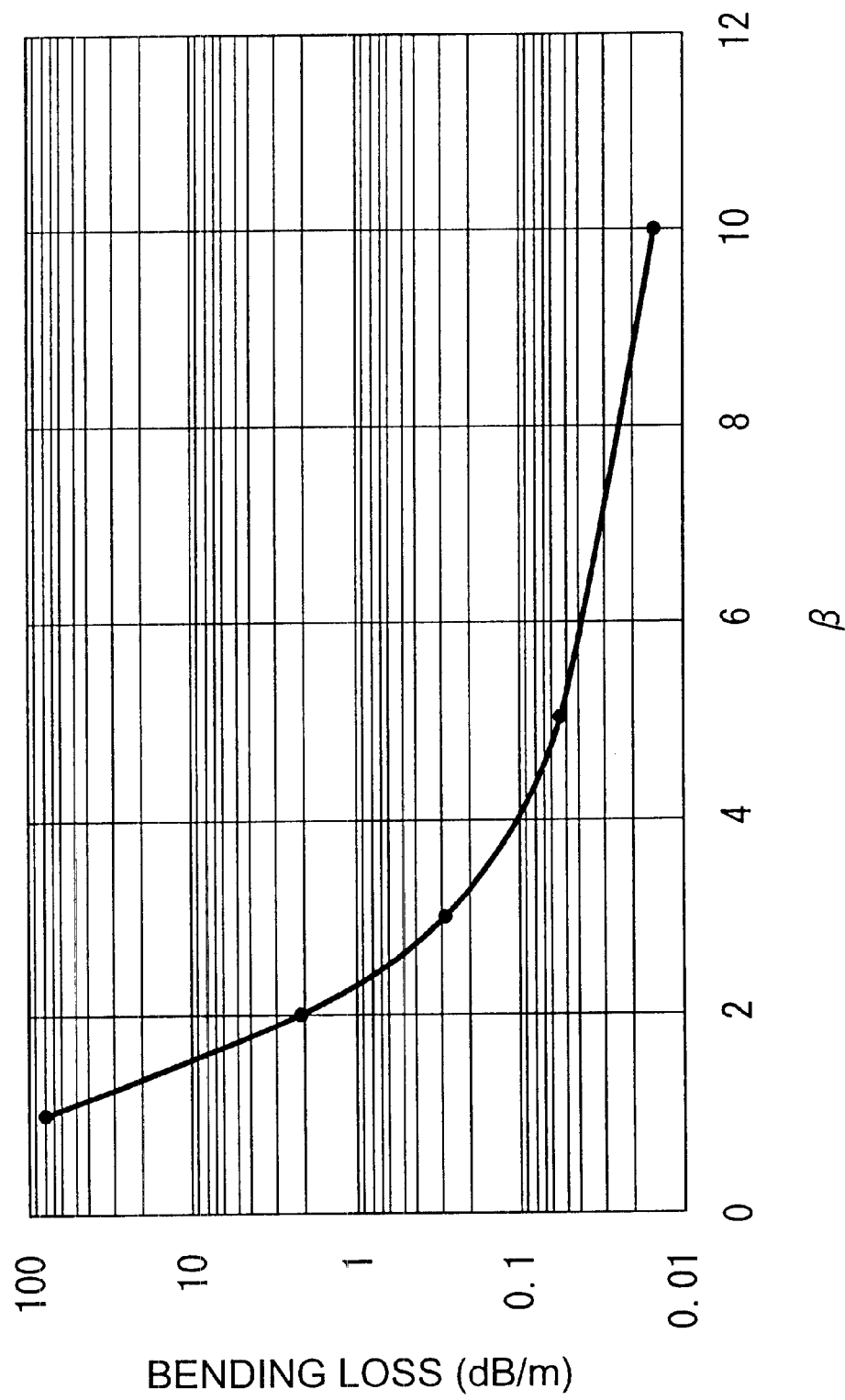
FIG. 13 is a graph showing the relationship between the value β and the bending loss of the dispersion compensating optical fiber.

The bending loss (bending diameter: 20 mmø, and wavelength: 1,550 nm) and transmission loss of the dispersion compensating optical fiber 12 will be described next. Assume that the core region 31 (0≤r≤a) of the dispersion compensating optical fiber 12 shown in FIGS. 3A and 3B has an index distribution n(r) of βth power, which is given by $$n(r) = n_1\left\{1 - 2\Delta\left(\frac{r}{a}\right)^\beta\right\}^{1/2} \tag{10a}$$

$$\Delta = \frac{n_1^2 - n_2^2}{2n_1^2} \tag{10b}$$

where r is the radial distance from the center of the core region 31, $n_1$ is the refractive index at the center (r=0) of the core region 31, and $n_2$ is the refractive index of the first cladding region 32. Assume that the relative refractive index difference Δ⁺ of the core region 31 is +1.6%, and the relative refractive index difference Δ⁻ of the first cladding region 32 is −0.36%. The dispersion value $D_{DCF}$ of the dispersion compensating optical fiber 12 is −50 ps/nm/km, and the dispersion slope compensating ratio η is 50%. FIG. 13 is a graph showing the relationship between the value β and the bending loss of the dispersion compensating optical fiber 12. As is apparent from this graph, the larger the value β is, the smaller the bending loss of the dispersion compensating optical fiber 12 is. When the value β is 2.0 or more, the bending loss of the dispersion compensating optical fiber 12 is suitably 2 dB/m or less. At this time, the transmission loss of the dispersion compensating optical fiber 12 is suitably 0.4 dB/km or less.

The microbend loss of the dispersion compensating optical fiber 12 will be described next. A microbend loss is a loss generated when a side pressure is applied to the optical fiber to slightly bend the optical fiber axis. The microbend loss is measured as a loss that increases when the optical fiber is wound on a 280-mmø bobbin with No. 1,000 sandpaper at a tensile force of 100 g. The smaller the diameter of the core 31 is, the smaller the microbend loss is. The larger the outer diameter (optical fiber diameter) of the second cladding region 33 is, the smaller the microbend loss is. The larger the diameter of resin coating around the second cladding region 33 is, the smaller the microbend loss is. On the other hand, when the outer diameter (optical fiber diameter) or coating diameter of the second cladding region 33 is large, a cable formed from the optical fiber undesirably becomes bulky. In addition, when the outer diameter (optical fiber diameter) of the second cladding region 33 is large, the rupture probability of the optical fiber becomes high. To sufficiently reduce the microbend loss, the coating diameter preferably falls within the range of 235 to 415 μm. To sufficiently reduce the microbend loss and obtain a rupture probability of $10^{-5}$ or less, which poses no practical problem, the outer diameter (optical fiber diameter) of the second cladding region 33 preferably falls within the range of 115 to 200 μm.

The reason why the leading wavelength preferably falls within the range of 1,565 to 1,700 nm and, more preferably, 1,620 to 1,700 nm will be described next.

Losses unique to an optical fiber include a loss due to Rayleigh scattering, a loss due to absorption, and a loss due to structure mismatching. Letting λ (unit: μm) be the wavelength of an optical signal, a Rayleigh scattering loss is represented by $A/\lambda^4$ where A is the Rayleigh scattering coefficient. A loss due to structure mismatching is represented by a constant B. An absorption loss in the infrared range is represented by $C \cdot \exp(-D/\lambda)$ where C is a constant ($=6.65 \times 10^{12}$) and D is a constant ($=52.67$). That is, a theoretical loss value $\alpha_0(\lambda)$ of the optical fiber in the infrared range is given by $$\alpha_0(\lambda) = A/\lambda^4 + B + C \cdot \exp(-D/\lambda) \quad (11)$$

As the manufacturing technique improves, the loss of an optical fiber is reaching the theoretical loss value $\alpha_0$.

However, the loss (actual loss value $\alpha_1(\lambda)$) in actual use of the optical fiber may be larger than the theoretical loss value $\alpha_0(\lambda)$. This phenomenon is caused by bending and readily occurs as the wavelength λ becomes long, and especially, in the dispersion compensating optical fiber. If the actual loss value $\alpha_1$ of the optical fiber becomes large in the use wavelength band, an optical transmission system using this optical fiber as an optical transmission line requires a number of optical amplifiers for amplifying an optical signal, resulting in high cost. Alternatively, pulses readily deform due to the nonlinear phenomenon which occurs when high-power light is incident. Hence, to prevent the transmission loss from increasing in the use wavelength band, the leading wavelength of the dispersion compensating optical fiber 12 must be defined. The preferable range of the leading wavelength of the dispersion compensating optical fiber 12 is obtained in the following way.

Figure 14:
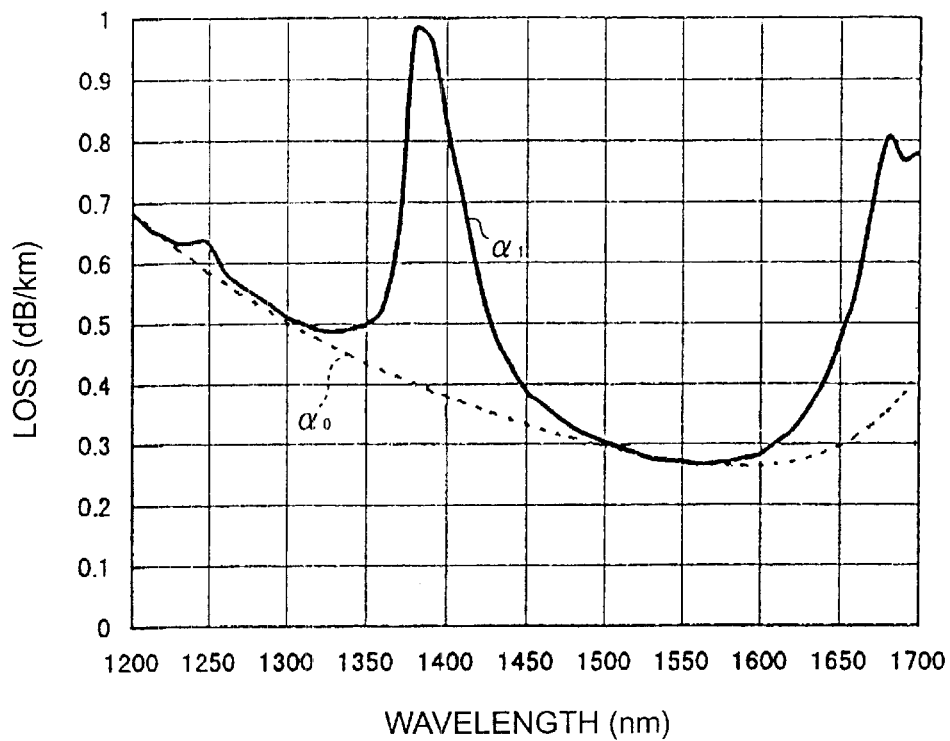
FIG. 14 is a graph showing an actual loss value $α_1(λ)$ and theoretical loss value $α_0(λ)$ of the dispersion compensating optical fiber.
Figure 15:
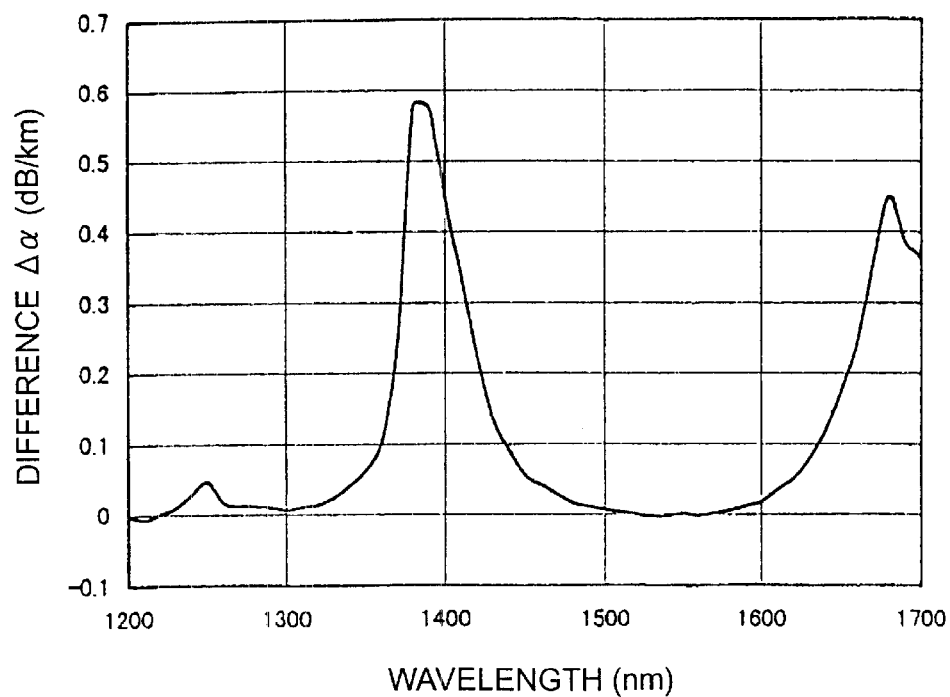
FIG. 15 is a graph showing a difference $Δα(λ)$ between the actual loss value $α_1(λ)$ and the theoretical loss value $α_0(λ)$ of the dispersion compensating optical fiber.
Figure 16:
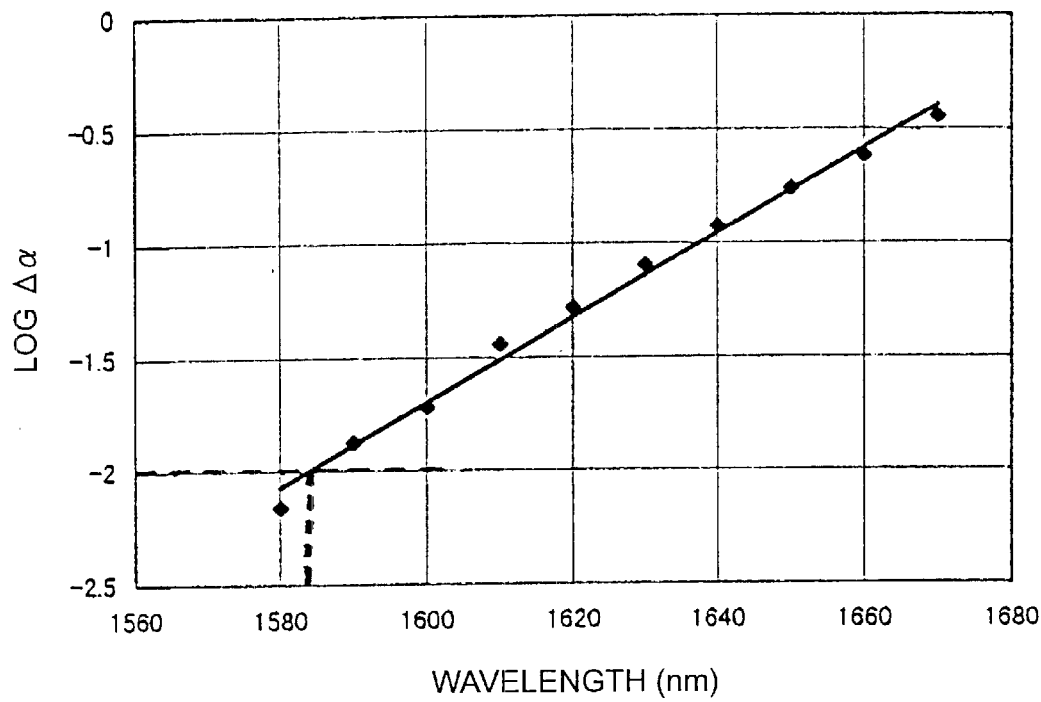
FIG. 16 is a graph showing a logarithm $\log(Δα(λ))$.

The "leading wavelength" is defined as follows. FIGS. 14 to 16 are explanatory views of the leading wavelength. Referring to FIG. 14, the solid line indicates the actual loss value $\alpha_1(\lambda)$ of the dispersion compensating optical fiber 12, and the broken line indicates the theoretical loss value $\alpha_0(\lambda)$. As shown in FIG. 14, the theoretical loss value $\alpha_0(\lambda)$ of the dispersion compensating optical fiber 12 is minimum near a wavelength band of 1,500 to 1,650 nm. On the other hand, the actual loss value $\alpha_1(\lambda)$ of the dispersion compensating optical fiber 12 almost matches the theoretical loss value $\alpha_0(\lambda)$ near a wavelength of 1,550 nm. Hence, a wavelength band of 1,520 to 1,565 nm is used as a signal wavelength band for an optical transmission system. A wavelength band of 1,565 to 1,620 nm may also be used. Referring to FIG. 14, the actual loss value $\alpha_1(\lambda)$ is larger than the theoretical loss value $\alpha_0(\lambda)$ near a wavelength of 1,380 nm due to the hydroxyl group and also larger than the theoretical loss value $\alpha_0(\lambda)$ near a wavelength of 1,580 nm.

FIG. 15 is a graph showing a difference $\Delta\alpha(\lambda)$ between the actual loss value $\alpha_1(\lambda)$ and the theoretical loss value $\alpha_0(\lambda)$ of the dispersion compensating optical fiber 12 shown in FIG. 14. The difference $\Delta\alpha(\lambda)$ is given by $$\Delta\alpha(\lambda) = \alpha_1(\lambda) - \alpha_0(\lambda) \quad (12)$$

FIG. 16 is a graph showing a logarithm $\log(\Delta\alpha(\lambda))$ of this difference. As shown in the graph of FIG. 16, the logarithm $\log(\Delta\alpha(\lambda))$ and the wavelength λ have an almost linear relationship when the wavelength is 1,580 nm or more. The minimum wavelength corresponding to a logarithm $\log(\Delta\alpha(\lambda))$ of −2 or more (i.e., the value $\Delta\alpha(\lambda)$ is 10 mdB/km or more) in the use wavelength band and on the long wavelength side of the use wavelength band is defined as a "leading wavelength". For the dispersion compensating optical fiber 12 having the actual loss value $\alpha_1(\lambda)$ shown in FIGS. 14 to 16, the leading wavelength is 1,582 nm. As the characteristics of this dispersion compensating optical fiber 12, the transmission loss is 0.267 dB/km, the dispersion value is −55.12 ps/nm/km, the dispersion slope is −0.049 ps/nm²/km, the mode field diameter (MFD) is 5.4 μm, the effective sectional area $A_{\it eff}$ is 21.9 μm², and the bending loss (20ø) is 4.1 dB/m.

Figure 17:
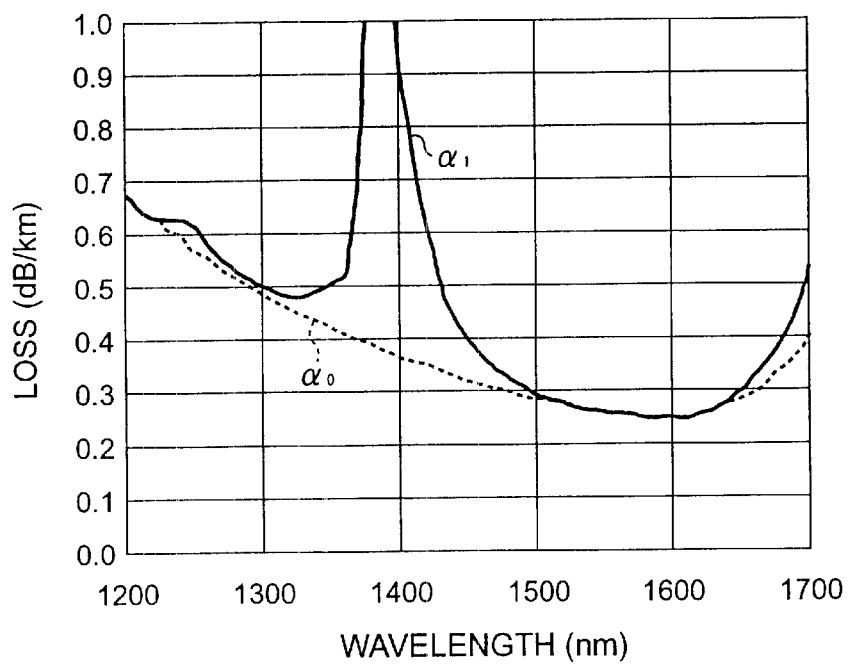
FIG. 17 is a graph showing the actual loss value $α_1(λ)$ and theoretical loss value $α_0(λ)$ of another dispersion compensating optical fiber.
Figure 18:
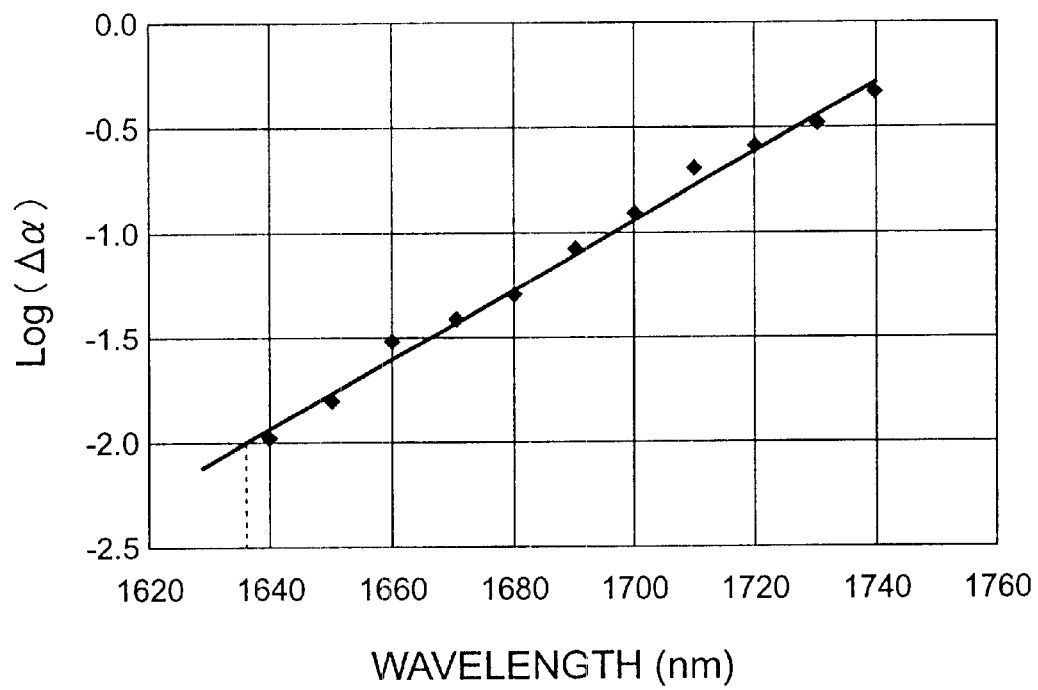
FIG. 18 is a graph showing the logarithm $\log(Δα(λ))$ of the difference $Δα(λ)$ between the actual loss value $α_1(λ)$ and the theoretical loss value $α_0(λ)$ of another dispersion compensating optical fiber.

FIGS. 17 and 18 are explanatory views of the leading wavelength of another dispersion compensating optical fiber 12. Referring to FIG. 17, the solid line indicates the actual loss value $\alpha_1(\lambda)$ of the dispersion compensating optical fiber 12, and the broken line indicates the theoretical loss value $\alpha_1(\lambda)$. As shown in FIG. 17, the theoretical loss value $\alpha_1(\lambda)$ of the dispersion compensating optical fiber 12 is minimum near a wavelength band of 1,500 to 1,650 nm. On the other hand, the actual loss value $\alpha_1(\lambda)$ of the dispersion compensating optical fiber 12 almost matches the theoretical loss value $\alpha_0(\lambda)$ near a wavelength of 1,520 to 1,620 nm. Hence, a wavelength band of 1,520 to 1,620 nm is used as a signal wavelength band for an optical transmission system. Referring to FIG. 16, the actual loss value $\alpha_1(\lambda)$ is larger than the theoretical loss value $\alpha_0(\lambda)$ near a wavelength of 1,380 nm due to the hydroxyl group and also larger than the theoretical loss value $\alpha_0(\lambda)$ near a wavelength of 1,630 nm.

FIG. 18 is a graph showing the logarithm $\log(\Delta\alpha(\lambda))$ of the difference $\Delta\alpha(\lambda)$ between the actual loss value $\alpha_1(\lambda)$ and the theoretical loss value $\alpha_0(\lambda)$. As shown in this graph, the logarithm $\log(\Delta\alpha(\lambda))$ and the wavelength λ have an almost linear relationship when the wavelength is 1,630 nm or more. The leading wavelength as the minimum wavelength corresponding to a logarithm $\log(\Delta\alpha(\lambda))$ of $-2$ or more (i.e., the value $\Delta\alpha(\lambda)$ is 10 mdB/km or more) in the use wavelength band and on the long wavelength side of the use wavelength band is 1,637 nm. As the characteristics of this dispersion compensating optical fiber 12, the transmission loss is 0.256 dB/km, the dispersion value is $-41.76$ ps/nm/km, the dispersion slope is $-0.0741$ ps/nm²/km, the mode field diameter (MFD) is 5.1 μm, the effective sectional area $A_{\text{eff}}$ is 19.5 μm², and the bending loss (20ø) is 0.7 dB/m.

Figure 19:
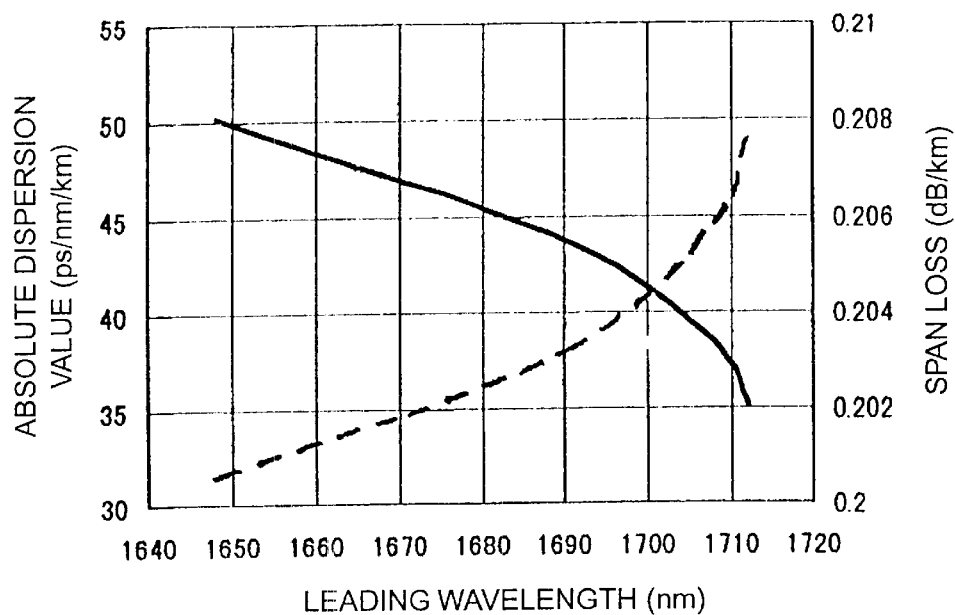
FIG. 19 is a graph showing the absolute dispersion value and span loss with respect to the leading wavelength of the dispersion compensating optical fiber.
Figure 20:
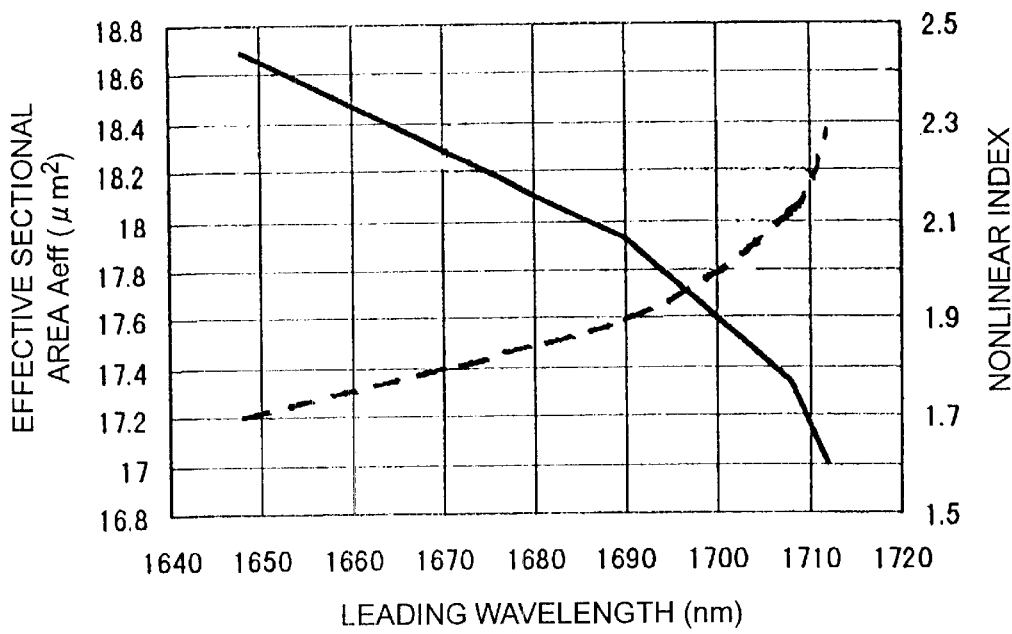
FIG. 20 is a graph showing the effective sectional area and nonlinear index with respect to the leading wavelength of the dispersion compensating optical fiber.

FIG. 19 is a graph showing the absolute dispersion value (indicated by the solid line) and span loss (indicated by the broken line) with respect to the leading wavelength of the dispersion compensating optical fiber 12. FIG. 20 is a graph showing the effective sectional area (indicated by the solid line) and nonlinear index (indicated by the broken line) with respect to the leading wavelength of the dispersion compensating optical fiber 12. The absolute dispersion value and effective sectional area are values in the dispersion compensating optical fiber 12 at a wavelength of 1,550 nm. The span loss and nonlinear index are values in the optical transmission line at the wavelength of 1,550 nm. Assume that the relative refractive index difference $\Delta^+$ of the core region 31 to the second cladding region 33 of the dispersion compensating optical fiber 12 is +1.64%, and the relative refractive index difference $\Delta^-$ of the first cladding region 32 to the second cladding region 33 is $-0.36\%$.

Additionally, assume that the core region 31 of the dispersion compensating optical fiber 12 has the square of an index distribution ($\beta=2$ in equation (10)), and the dispersion slope compensating ratio η of the optical transmission line 1 is 40%.

As is apparent from the graphs of FIGS. 19 and 20, when the leading wavelength of the dispersion compensating optical fiber 12 is long, both the average transmission loss (span loss) of the entire optical transmission line 1 and the nonlinear index undesirably increase. To reduce both the transmission loss and nonlinear index of the optical transmission line 1, the leading wavelength of the dispersion compensating optical fiber 12 must have a predetermined value or less. When the fact that the nonlinear index $\Delta\phi$ of the dispersion shift optical fiber (NZ-DSF) having a zero dispersion wavelength on the long wavelength side of 1,550 nm is 2.1 is taken into consideration, the upper limit of the preferable range of the leading wavelength of the dispersion compensating optical fiber 12 is 1,700 nm. Assume that the leading wavelength of the dispersion compensating optical fiber 12 is included in the use wavelength band. In this case, in the range equal to or larger than the leading wavelength of the use wavelength band, the actual loss value $\alpha_1(\lambda)$ of the dispersion compensating optical fiber 12 undesirably increases. Hence, the lower limit of the preferable range of the leading wavelength of the dispersion compensating optical fiber 12 matches the upper limit of the use wavelength band.

If the use wavelength band is the C band (1,520 to 1,565 nm), the leading wavelength of the dispersion compensating optical fiber 12 preferably falls within the range of 1,565 to 1,700 nm. If the use wavelength band includes not only the C band but also the L band (1,565 to 1,620 nm), the leading wavelength of the dispersion compensating optical fiber 12 preferably falls within the range of 1,620 to 1,700 nm. When the leading wavelength of the dispersion compensating optical fiber 12 is present in this preferable range, the transmission loss of the dispersion compensating optical fiber 12 becomes sufficiently small in the use wavelength band. In addition, both the transmission loss and nonlinear index of the optical transmission line 1 formed by connecting the single-mode optical fiber 11 and dispersion compensating optical fiber 12 also become sufficiently small.

As described above, the dispersion compensating optical fiber 12 according to this embodiment is preferably connected to the single-mode optical fiber 11 to construct the optical transmission line 1. An optical transmission system having this optical transmission line 1 requires a small number of optical amplifiers for amplifying an optical signal, resulting in low cost. In addition, since the transmission loss is small, the input power can be reduced. Furthermore, since the nonlinear index of the entire optical transmission line 1 can be suppressed sufficiently small, the nonlinear optical phenomenon hardly occurs, and the optical transmission line can be suitably used for long-distance large-capacity transmission.

Figure 21A:
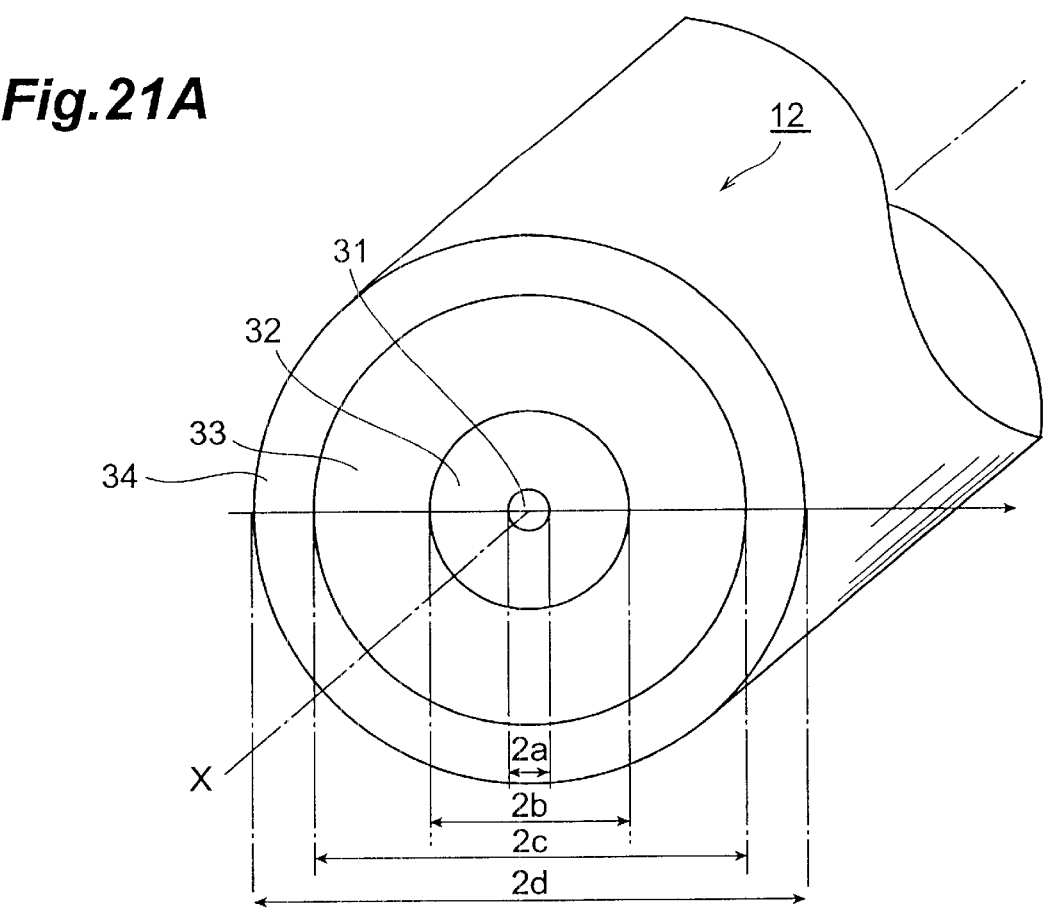
FIG. 21A is a sectional view schematically showing another structure of the dispersion compensating optical fiber according to this embodiment.
Figure 21B:
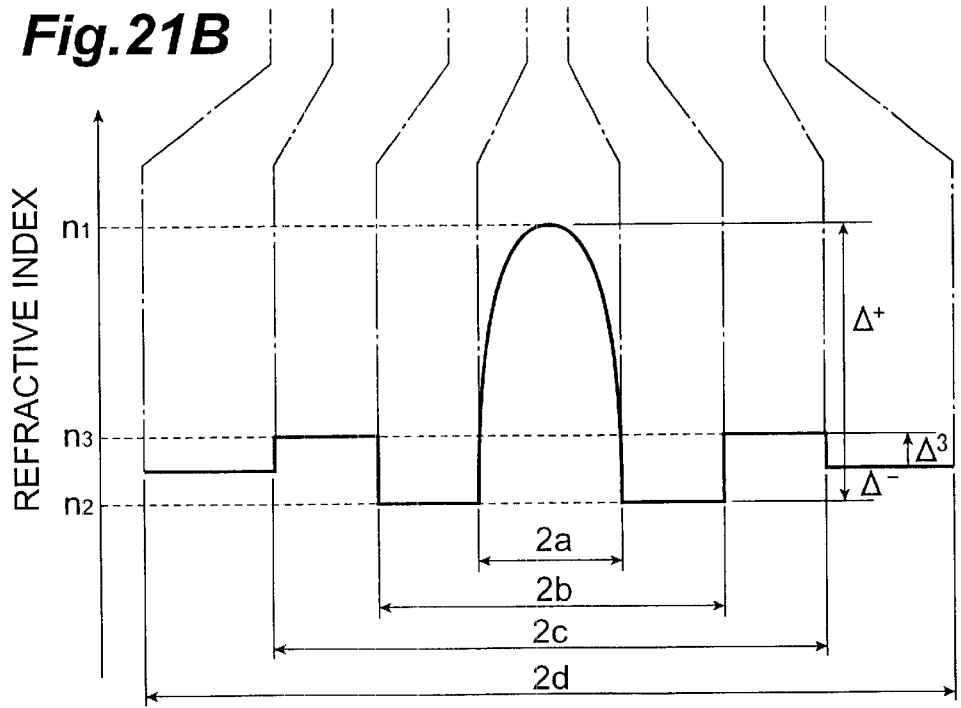
FIG. 21B is a view showing the refractive index profile of the dispersion compensating optical fiber shown in FIG. 21A.

The refractive index profile of the dispersion compensating optical fiber 12 according to this embodiment is not limited to that shown in FIGS. 3A and 3B. FIG. 21A is a sectional view schematically showing another structure of the dispersion compensating optical fiber 12 according to this embodiment. FIG. 21B is a view showing the refractive index profile of the dispersion compensating optical fiber 12. As shown in FIGS. 21A and 21B, the dispersion compensating optical fiber 12 may have the core region 31 including the optical axis center X and having the refractive index $n_1$, the first cladding region 32 surrounding the core region 31 and having the refractive index $n_2$, the second cladding region 33 surrounding the first cladding region 32 and having the refractive index $n_3$, and a third cladding region 34 surrounding the second cladding region 33 and having a refractive index $n_4$. A relationship $n_1 > n_3 > n_4 > n_2$ holds between the refractive indices. The dispersion compensating optical fiber 12 with such a structure can be implemented using silica glass as a base by, e.g., doping appropriate doses of $GeO_2$ in the core region 31 and second cladding region 33, and F in the first cladding region 32. In the dispersion compensating optical fiber 12 having this refractive index profile as well, the dispersion value $D_{DCF}$ and dispersion slope $S_{DCF}$ at the wavelength of 1,550 nm can satisfy equations (3a) and (3b).

The relative refractive index difference $\Delta^+$ of the core region 31 to the third cladding region 34 is preferably 1.3% to 1.7%, and the relative refractive index difference $\Delta^-$ of the first cladding region 32 to the third cladding region 34 preferably $-0.5\%$ to $-0.2\%$.

The relative refractive index difference $\Delta^+$ of the core region 31 to the third cladding region 34 and the relative refractive index difference $\Delta^-$ of the first cladding region 32 to the third cladding region 34 are defined by $$\Delta^+ = (n_1 - n_4)/n_4$$

$$\Delta^- = (n_2 - n_4)/n_4$$

where $n_1$ is the refractive index of the core region 31, $n_2$ is the refractive index of the first cladding region 32, and $n_4$ is the refractive index of the third cladding region 34. In this specification, the relative refractive index difference is represented in percentage, and the refractive indices of the respective regions in the above definitions are not in order. Hence, when the relative refractive index difference has a negative value, the corresponding region has a refractive index lower than that of the third cladding region 34.

Detailed examples of the dispersion compensating optical fiber 12 of this embodiment will be described next. Each of the first to fifth examples of the dispersion compensating optical fiber 12 has the refractive index profile shown in FIGS. 3A and 3B. Each of the sixth to eighth examples of the dispersion compensating optical fiber 12 has the refractive index profile shown in FIGS. 21A and 21B.

The first example of the dispersion compensating optical fiber 12 has the refractive index profile shown in FIGS. 3A and 3B. The diameter 2a of the core region 31 is 4.34 µm, the outer diameter 2b of the first cladding region 32 is 9.24 µm, the outer diameter 2c of the second cladding region 33 is 125 µm, the relative refractive index difference $\Delta^+$ of the core region 31 is +1.35%, and the relative refractive index difference $\Delta^-$ of the first cladding region 32 is −0.36%. At the wavelength of 1,550 nm, the dispersion value $D_{DCF}$ of this dispersion compensating optical fiber 12 is −35.5 ps/nm/km, and the dispersion slope $S_{DCF}$ is −0.076 ps/nm²/km, which satisfy equations (3a) and (3b). At the wavelength of 1,550 nm, the effective sectional area $A_{eff}$ of this dispersion compensating optical fiber 12 is 19.66 µm², the nonlinear refractive index $n_{NL}$ is 3.83×10³¹ ²⁰ m²/W, and the transmission loss is 0.27 dB/km.

The second example of the dispersion compensating optical fiber 12 has the refractive index profile shown in FIGS. 3A and 3B. The diameter 2a of the core region 31 is 3.30 µm, the outer diameter 2b of the first cladding region 32 is 8.24 µm, the outer diameter 2c of the second cladding region 33 is 125 µm, the relative refractive index difference $\Delta^+$ of the core region 31 is +1.70%, and the relative refractive index difference $\Delta^-$ of the first cladding region 32 is −0.36%. At the wavelength of 1,550 nm, the dispersion value $D_{DCF}$ of this dispersion compensating optical fiber 12 is −68.2 ps/nm/km, and the dispersion slope $S_{DCF}$ is −0.145 ps/nm²/km, which satisfy equations (3a) and (3b). At the wavelength of 1,550 nm, the effective sectional area $A_{eff}$ of this dispersion compensating optical fiber 12 is 16.31 µm², the nonlinear refractive index $n_{NL}$ is 4.13×10⁻²⁰ m²/W, and the transmission loss is 0.35 dB/km.

The third example of the dispersion compensating optical fiber 12 has the refractive index profile shown in FIGS. 3A and 3B. The diameter 2a of the core region 31 is 4.35 µm, the outer diameter 2b of the first cladding region 32 is 8.20 µm, the outer diameter 2c of the second cladding region 33 is 125 µm, the relative refractive index difference $\Delta^+$ of the core region 31 is +1.35%, and the relative refractive index difference $\Delta^-$ of the first cladding region 32 is −0.36%. At the wavelength of 1,550 nm, the dispersion value $D_{DCF}$ of this dispersion compensating optical fiber 12 is −39.2 ps/nm/km, and the dispersion slope $S_{DCF}$ is −0.060 ps/nm²/km, which satisfy equations (3a) and (3b). At the wavelength of 1,550 nm, the effective sectional area $A_{eff}$ of this dispersion compensating optical fiber 12 is 20.63 µm², the nonlinear refractive index $n_{NL}$ is 3.82×10⁻²⁰ m²/W, and the transmission loss is 0.27 dB/km.

The fourth example of the dispersion compensating optical fiber 12 has the refractive index profile shown in FIGS. 3A and 3B. The diameter 2a of the core region 31 is 3.29 µm, the outer diameter 2b of the first cladding region 32 is 7.32 µm, the outer diameter 2c of the second cladding region 33 is 125 µm, the relative refractive index difference $\Delta^+$ of the core region 31 is +1.70%, and the relative refractive index difference $\Delta^-$ of the first cladding region 32 is −0.36%. At the wavelength of 1,550 nm, the dispersion value $D_{DCF}$ of this dispersion compensating optical fiber 12 is −71.8 ps/nm/km, and the dispersion slope $S_{DCF}$ is −0.109 ps/nm²/km, which satisfy equations (3a) and (3b). At the wavelength of 1,550 nm, the effective sectional area $A_{eff}$ of this dispersion compensating optical fiber 12 is 17.16 µm², the nonlinear refractive index $n_{NL}$ is 4.14×10⁻²⁰ m²/W, and the transmission loss is 0.35 dB/km.

The fifth example of the dispersion compensating optical fiber 12 has the refractive index profile shown in FIGS. 3A and 3B. The diameter 2a of the core region 31 is 4.35 µm, the outer diameter 2b of the first cladding region 32 is 7.50 µm, the outer diameter 2c of the second cladding region 33 is 125 µm, the relative refractive index difference $\Delta^+$ of the core region 31 is +1.35%, and the relative refractive index difference $\Delta^-$ of the first cladding region 32 is −0.36%. At the wavelength of 1,550 nm, the dispersion value $D_{DCF}$ of this dispersion compensating optical fiber 12 is −40.0 ps/nm/km, and the dispersion slope $S_{DCF}$ is −0.0366 ps/nm²/km, which satisfy equations (3a) and (3b). At the wavelength of 1,550 nm, the effective sectional area $A_{eff}$ of this dispersion compensating optical fiber 12 is 21.45 µm², the nonlinear refractive index $n_{NL}$ is 3.82×10⁻²⁰ m²/W, and the transmission loss is 0.27 dB/km.

The sixth example of the dispersion compensating optical fiber 12 has the refractive index profile shown in FIGS. 21A and 21B. The diameter 2a of the core region 31 is 4.44 µm, the outer diameter 2b of the first cladding region 32 is 8.88 µm, an outer diameter 2c of the second cladding region 33 is 14.80 µm, the outer diameter 2d of the third cladding region 34 is 125 µm, the relative refractive index difference $\Delta^+$ of the core region 31 is +1.50%, the relative refractive index difference $\Delta^-$ of the first cladding region 32 is −0.37%, and the relative refractive index difference $\Delta_3$ of the second cladding region 33 is +0.20%. At the wavelength of 1,550 nm, the dispersion value $D_{DCF}$ of this dispersion compensating optical fiber 12 is −57.94 ps/nm/km, and the dispersion slope $S_{DCF}$ is −0.106 ps/nm²/km, which satisfy equations (3a) and (3b). At the wavelength of 1,550 nm, the effective sectional area $A_{eff}$ of this dispersion compensating optical fiber 12 is 21.59 µm², the nonlinear refractive index $n_{NL}$ is 3.88×10⁻²⁰ m²/W, and the transmission loss is 0.3 dB/km.

The seventh example of the dispersion compensating optical fiber 12 has the refractive index profile shown in FIGS. 21A and 21B. The diameter 2a of the core region 31 is 5.41 µm, the outer diameter 2b of the first cladding region 32 is 8.20 µm, the outer diameter 2c of the second cladding region 33 is 16.40 µm, the outer diameter 2d of the third cladding region 34 is 125 µm, the relative refractive index difference $\Delta^+$ of the core region 31 is +1.35%, the relative refractive index difference $\Delta^-$ of the first cladding region 32 is −0.50%, and the relative refractive index difference $\Delta_3$ of the second cladding region 33 is +0.20%. At the wavelength of 1,550 nm, the dispersion value $D_{DCF}$ of this dispersion compensating optical fiber 12 is −38.14 ps/nm/km, and the dispersion slope $S_{DCF}$ is −0.066 ps/nm²/km, which satisfy equations (3a) and (3b). At the wavelength of 1,550 nm, the effective sectional area $A_{eff}$ of this dispersion compensating optical fiber 12 is 22.51 µm², the nonlinear refractive index $n_{NL}$ is 3.83×10⁻²⁰ m²/W, and the transmission loss is 0.3 dB/km.

The eighth example of the dispersion compensating optical fiber 12 has the refractive index profile shown in FIGS. 21A and 21B. The diameter 2a of the core region 31 is 3.70 µm, the outer diameter 2b of the first cladding region 32 is 11.40 µm, the outer diameter 2c of the second cladding region 33 is 14.80 µm, the outer diameter 2d of the third cladding region 34 is 125 µm, the relative refractive index difference $\Delta^+$ of the core region 31 is +1.65%, the relative refractive index difference $\Delta^-$ of the first cladding region 32 is −0.20%, and the relative refractive index difference $\Delta_3$ of the second cladding region 33 is +0.40%. At the wavelength of 1,550 nm, the dispersion value $D_{DCF}$ of this dispersion compensating optical fiber 12 is −76.68 ps/nm/km, and the dispersion slope $S_{DCF}$ is −0.094 ps/nm²/km, which satisfy equations (3a) and (3b). At the wavelength of 1,550 nm, the effective sectional area $A_{eff}$ of this dispersion compensating optical fiber 12 is 24.27 $\mu m^2$, the nonlinear refractive index $n_{NL}$ is $3.90 \times 10^{-20}$ m$^2$/W, and the transmission loss is 0.33 dB/km.

The dispersion compensating optical fiber 12 according to this embodiment is connected, at an appropriate length ratio, to the single-mode optical fiber 11 having a zero dispersion wavelength in the 1.3-$\mu$m band and positive dispersion at the wavelength of 1,550 nm to form the optical transmission line 1 which reduces both the transmission loss and nonlinear index.

Since the optical transmission line 1 having this arrangement has a low refractive index and low nonlinear index, the nonlinear optical phenomenon is suppressed. Hence, the optical transmission line is suitable to long-distance large-capacity transmission.

As is apparent from the above description of the present invention, various changes and modifications can be made without departing from the spirit and scope of the present invention, and improvements which are obvious to those skilled in the art are incorporated in the appended claims.

What is claimed is:

1. A dispersion compensating optical fiber having:
   a dispersion value $D_{DCF}$ (unit: ps/nm/km) falling within a range of $-82 \leq D_{DCF} \leq -29$ at a wavelength of 1,550 nm;
   a dispersion slope $S_{DCF}$ (unit: ps/nm$^2$/km) falling within a range of $0.0023 \times D_{DCF} \leq S_{DCF} \leq 0.033 + 0.0015 \times D_{DCF}$ at the wavelength of 1,550 nm; and
   a transmission loss of not more than 0.5 dB/km at the wavelength of 1,550 nm.

2. A fiber according to claim 1, wherein said dispersion compensating optical fiber comprises:
   a core region including an optical axis center and having a first refractive index;
   a first cladding region surrounding said core region and having a second refractive index lower than the first refractive index; and
   a second cladding region surrounding said first cladding region and having a third refractive index lower than the first refractive index and higher than the second refractive index.

3. A fiber according to claim 2, wherein a relative refractive index difference of said core region to said second cladding region falls within the range of 1.3% to 1.7%, and a relative refractive index difference of said first cladding region to said second cladding region falls within the range of -0.5% to -0.2%.

4. A fiber according to claim 1, wherein said dispersion compensating optical fiber comprises:
   a core region including an optical axis center and having a first refractive index;
   a first cladding region surrounding said core region and having a second refractive index lower than the first refractive index;
   a second cladding region surrounding said first cladding region and having a third refractive index lower than the first refractive index and higher than the second refractive index; and
   a third cladding region surrounding said second cladding region and having a fourth refractive index lower than the third refractive index and higher than the second refractive index.

5. A fiber according to claim 4, wherein a relative refractive index difference of said core region to third cladding region falls within the range of 1.3% to 1.7%, and a relative refractive index difference of said first cladding region to said third cladding region falls within the range of -0.5% to -0.2%.

6. A fiber according to claim 1, wherein said dispersion compensating optical fiber has a minimum wavelength at which an increase amount of an actual loss value with respect to a theoretical loss value is not less than 10 mdB/km in a use wavelength band and on a long wavelength side of the use wavelength band, the minimum wavelength falling within a range of 1,565 to 1,700 nm.

7. A fiber according to claim 6, wherein the minimum wavelength falls within a range of 1,620 to 1,700 nm.

8. An optical transmission line formed by connecting:
   a single-mode optical fiber having a zero dispersion wavelength in a 1.3-$\mu$m wavelength band and positive dispersion at a wavelength of 1,550 nm; and
   said dispersion compensating optical fiber of claim 6.

9. An optical transmission line formed by connecting:
   a single-mode optical fiber having a zero dispersion wavelength in a 1.3-$\mu$m wavelength band and a positive dispersion slope $S_{SMF}$ (unit: ps/nm$^2$/km) at a wavelength of 1,550 nm and used for a cable line; and
   a dispersion compensating optical fiber, when letting R be a DCF ratio representing a ratio of the length of said dispersion compensating optical fiber to the length of the entire cable line, having a dispersion value $D_{DCF}$ (unit: ps/nm/km) falling within a range of $-82 \leq D_{DCF} \leq -29$ at the wavelength of 1,550 nm, a dispersion slope $S_{DCF}$ (unit: ps/nm$^2$/km) falling within a range of $0.0023 \times D_{DCF} \leq S_{DCF} \leq [0.03 - (1-R)S_{SMF}]/R$ (unit: ps/nm$^2$/km) at the wavelength of 1,550 nm, and a transmission loss of not more than 0.5 dB/km at the wavelength of 1,550 nm.

10. A line according to claim 9, wherein said dispersion compensating optical fiber has the dispersion value $D_{DCF}$ (unit: ps/nm/km) falling within a range of $-82 \leq D_{DCF} \leq -36$ at the wavelength of 1,550 nm.

11. A line according to claim 9, wherein the DCF ratio R is 0.2 to 0.4.

12. A line according to claim 9, wherein said single-mode optical fiber has an effective sectional area $A_{eff}$ of not less than 100 $\mu m^2$ at the wavelength of 1,550 nm.

13. A line according to claim 9, wherein
   said single-mode optical fiber has a core region and a cladding region, and
   said core region is formed from silica which is not intentionally doped with an impurity, and transmission loss at the wavelength of 1,550 nm is not more than 0.18 dB/km.

14. A dispersion compensating optical fiber having:
   a minimum wavelength at which an increase amount of an actual loss value with respect to a theoretical loss value is not less than 10 mdB/km in a use wavelength band and on a long wavelength side of the use wavelength band, the minimum wavelength falling within a range of 1,565 to 1,700 nm.

15. A fiber according to claim 14, wherein the minimum wavelength falls within a range of 1,620 to 1,700 nm.

* * * * *